US010370626B2

(12) United States Patent
Man et al.

(10) Patent No.: US 10,370,626 B2
(45) Date of Patent: Aug. 6, 2019

(54) REDUCED MISTING ACIDIC CLEANING, SANITIZING, AND DISINFECTING COMPOSITIONS VIA THE USE OF HIGH MOLECULAR WEIGHT WATER-IN-OIL EMULSION POLYMERS

(71) Applicant: Ecolab USA Inc., Saint Paul, MN (US)

(72) Inventors: Victor Fuk-Pong Man, Saint Paul, MN (US); Derrick Anderson, Saint Paul, MN (US); Paul Christian, Saint Paul, MN (US); Benjamin Crew, Saint Paul, MN (US); Xinyu Huang, Saint Paul, MN (US); Charles Allen Hodge, Saint Paul, MN (US); Amanda Ruth Blattner, Saint Paul, MN (US)

(73) Assignee: Ecolab USA Inc., Saint Paul, MN (US)

( * ) Notice: Subject to any disclaimer, the term of this patent is extended or adjusted under 35 U.S.C. 154(b) by 248 days.

(21) Appl. No.: 15/603,039

(22) Filed: May 23, 2017

(65) Prior Publication Data

US 2017/0335254 A1 Nov. 23, 2017

Related U.S. Application Data

(60) Provisional application No. 62/340,079, filed on May 23, 2016.

(51) Int. Cl.
*C11D 3/37* (2006.01)
*C11D 17/00* (2006.01)
(Continued)

(52) U.S. Cl.
CPC .......... *C11D 17/0043* (2013.01); *B08B 1/006* (2013.01); *B08B 3/08* (2013.01);
(Continued)

(58) Field of Classification Search
CPC . C11D 11/0023; C11D 3/0057; C11D 17/003; C11D 3/04
(Continued)

(56) References Cited

U.S. PATENT DOCUMENTS 3,644,210 A 2/1972 Crotty et al.
3,658,988 A 4/1972 Scher
(Continued)

FOREIGN PATENT DOCUMENTS

BG 65638 B1 4/2009
CA 1085238 A1 9/1980
(Continued)

OTHER PUBLICATIONS

Ecolab USA Inc., PCT/US2017/033936 filed May 23, 2017, "Notification of Transmittal of the International Search Report and the Written Opinion of the International Searching Authority, or the Declaration", dated Jul. 28, 2017.
(Continued)

*Primary Examiner* — Gregory E Webb
(74) *Attorney, Agent, or Firm* — McKee, Voorhees & Sease, PLC

(57) ABSTRACT

Acidic sprayable aqueous compositions for cleaning, sanitizing and disinfecting are disclosed. In particular, the sprayable compositions include an inverse emulsion polymer for modifying the viscosity of the composition and provide numerous benefits over dispersion polymer compositions used for rheology modification to reduce misting and respiratory inhalation of cleaning compositions. Compositions and methods of cleaning using the compositions having reduced amounts of airborne particulates of the composition during spray applications are provided.

23 Claims, 8 Drawing Sheets

(51) Int. Cl.

| | |
|---|---|
| ***B08B 1/00*** | (2006.01) |
| ***B08B 3/08*** | (2006.01) |
| ***C08J 3/05*** | (2006.01) |
| ***C11D 1/66*** | (2006.01) |
| ***C11D 3/20*** | (2006.01) |
| ***C11D 3/43*** | (2006.01) |
| ***C11D 3/04*** | (2006.01) |
| ***C11D 3/39*** | (2006.01) |
| *B05B 11/00* | (2006.01) |

(52) U.S. Cl.

CPC .................. *C08J 3/05* (2013.01); *C11D 1/66* (2013.01); *C11D 3/042* (2013.01); *C11D 3/2075* (2013.01); *C11D 3/2086* (2013.01); *C11D 3/37* (2013.01); *C11D 3/3947* (2013.01); *C11D 3/43* (2013.01); *B05B 11/3057* (2013.01); *C08J 2333/14* (2013.01); *C08J 2333/24* (2013.01); *C08J 2339/00* (2013.01)

(58) Field of Classification Search

USPC .................................................. 510/197, 475

See application file for complete search history.

(56) References Cited

U.S. PATENT DOCUMENTS

| | | | |
|---|---|---|---|
| 3,779,933 | A | 12/1973 | Eisen |
| 3,813,343 | A | 5/1974 | Mukai et al. |
| 3,829,387 | A | 8/1974 | Wise et al. |
| 4,140,516 | A | 2/1979 | Scher |
| 4,214,915 | A | 7/1980 | Dillarstone et al. |
| 4,314,841 | A | 2/1982 | Scher |
| 4,357,351 | A | 11/1982 | Fancher et al. |
| 4,425,241 | A | 1/1984 | Swanson |
| 4,426,362 | A | 1/1984 | Copeland et al. |
| 4,440,563 | A | 4/1984 | Scher |
| 4,492,646 | A | 1/1985 | Welch |
| 4,500,494 | A | 2/1985 | Scher |
| 4,510,081 | A | 4/1985 | Bronner et al. |
| 4,515,813 | A | 5/1985 | Fancher et al. |
| 4,618,914 | A | 10/1986 | Sato et al. |
| 4,647,258 | A | 3/1987 | Massarsch |
| 4,654,161 | A | 3/1987 | Kollmeier et al. |
| 4,673,704 | A | 6/1987 | Flesher et al. |
| 4,676,920 | A | 6/1987 | Culshaw |
| 4,687,121 | A | 8/1987 | Copeland |
| 4,690,305 | A | 9/1987 | Copeland |
| 4,767,563 | A | 8/1988 | de Buzzaccarini |
| RE32,763 | E | 10/1988 | Fernholt et al. |
| 4,778,836 | A | 10/1988 | Farrar et al. |
| RE32,818 | E | 1/1989 | Fernholt et al. |
| 4,826,661 | A | 5/1989 | Copeland et al. |
| 4,830,773 | A | 5/1989 | Olson |
| 4,877,691 | A | 10/1989 | Cockrell, Jr. |
| 4,898,611 | A | 2/1990 | Gross |
| 4,913,775 | A | 4/1990 | Langley et al. |
| 4,929,655 | A | 5/1990 | Takeda et al. |
| 4,933,167 | A | 6/1990 | Scher et al. |
| 4,950,725 | A | 8/1990 | Flesher et al. |
| 4,956,129 | A | 9/1990 | Scher et al. |
| 5,110,883 | A | 5/1992 | Gartner |
| 5,120,542 | A | 6/1992 | Scher et al. |
| 5,134,961 | A | 8/1992 | Giles et al. |
| 5,171,783 | A | 12/1992 | Gartner |
| 5,332,584 | A | 7/1994 | Scher et al. |
| 5,364,551 | A * | 11/1994 | Lentsch .................. C11D 1/94 510/100 |
| 5,393,381 | A | 2/1995 | Hund et al. |
| 5,397,506 | A | 3/1995 | Groth et al. |
| 5,454,984 | A | 10/1995 | Graubart et al. |
| 5,474,698 | A | 12/1995 | Rolando et al. |
| 5,501,815 | A | 3/1996 | Man |
| 5,518,634 | A | 5/1996 | Pillai et al. |
| 5,589,099 | A | 12/1996 | Baum |
| 5,601,723 | A | 2/1997 | Kirk et al. |
| 5,603,776 | A | 2/1997 | Lentsch et al. |
| 5,674,831 | A | 10/1997 | Schulz et al. |
| 5,700,771 | A | 12/1997 | Hardy et al. |
| 5,876,514 | A | 3/1999 | Rolando et al. |
| 5,880,089 | A | 3/1999 | Lentsch et al. |
| 5,912,207 | A | 6/1999 | Scher et al. |
| 5,945,494 | A | 8/1999 | Neff et al. |
| H1818 | H | 11/1999 | Potgieter et al. |
| 6,103,839 | A | 8/2000 | Patel et al. |
| 6,258,765 | B1 | 7/2001 | Wei et al. |
| 6,294,515 | B1 | 9/2001 | Baum |
| 6,294,622 | B1 | 9/2001 | Barajas et al. |
| 6,485,736 | B1 | 11/2002 | Shirley et al. |
| 6,530,383 | B1 | 3/2003 | Rogmann et al. |
| 6,537,961 | B1 | 3/2003 | Koch |
| 6,541,422 | B2 | 4/2003 | Scher et al. |
| 6,544,540 | B2 | 4/2003 | Van Koppenhagen et al. |
| 6,605,674 | B1 | 8/2003 | Whipple et al. |
| RE38,262 | E | 10/2003 | Rolando et al. |
| 6,750,190 | B2 | 6/2004 | Colurciello et al. |
| 6,753,388 | B1 | 6/2004 | Whipple et al. |
| 6,956,019 | B2 | 10/2005 | Lentsch et al. |
| 7,271,200 | B2 | 9/2007 | Scher et al. |
| 7,278,294 | B2 | 10/2007 | Giles et al. |
| 7,279,455 | B2 | 10/2007 | Kieffer et al. |
| 7,311,004 | B2 | 12/2007 | Giles |
| 7,502,665 | B2 | 3/2009 | Giles et al. |
| 7,566,448 | B2 | 7/2009 | Becker et al. |
| 7,592,301 | B2 | 9/2009 | Smith et al. |
| 7,665,348 | B2 | 2/2010 | Giles |
| 7,742,842 | B2 | 6/2010 | Giles et al. |
| 7,826,930 | B2 | 11/2010 | Giles et al. |
| 8,097,687 | B2 | 1/2012 | Kurian et al. |
| 8,109,448 | B2 | 2/2012 | Giles |
| 8,173,159 | B2 | 5/2012 | Scher et al. |
| 8,250,907 | B2 | 8/2012 | Giles |
| 8,865,632 | B1 | 10/2014 | Parnell et al. |
| 8,916,508 | B2 | 12/2014 | Parnell et al. |
| 9,206,381 | B2 | 12/2015 | Hodge et al. |
| 2002/0037306 | A1 | 3/2002 | Van Koppenhagen et al. |
| 2002/0069901 | A1 | 6/2002 | Evers |
| 2002/0192340 | A1 | 12/2002 | Swart et al. |
| 2003/0109403 | A1 | 6/2003 | Man et al. |
| 2003/0171243 | A1 | 9/2003 | Kischkel et al. |
| 2004/0010930 | A1 | 1/2004 | Dolechek et al. |
| 2004/0033269 | A1 | 2/2004 | Hei et al. |
| 2004/0157760 | A1 | 8/2004 | Man et al. |
| 2004/0224867 | A1 | 11/2004 | Colurciello et al. |
| 2006/0246242 | A1 | 11/2006 | Siegel et al. |
| 2007/0043119 | A1 | 2/2007 | Graeber et al. |
| 2007/0253926 | A1 | 11/2007 | Tadrowski et al. |
| 2007/0264344 | A1 | 11/2007 | Segura-Orsoni et al. |
| 2008/0230624 | A1 | 9/2008 | Giles et al. |
| 2008/0293615 | A1 | 11/2008 | Kieffer et al. |
| 2009/0035339 | A1 | 2/2009 | Istvan et al. |
| 2009/0111716 | A1 | 4/2009 | Hough et al. |
| 2009/0196897 | A1 | 8/2009 | Gladfelter et al. |
| 2010/0009886 | A1 | 1/2010 | Smith et al. |
| 2010/0286019 | A1 | 11/2010 | Scher et al. |
| 2010/0294498 | A1 | 11/2010 | Svoboda et al. |
| 2010/0300044 | A1 | 12/2010 | Man et al. |
| 2011/0092398 | A1 | 4/2011 | Dahanayake et al. |
| 2012/0168532 | A1 | 7/2012 | Giles |
| 2013/0172228 | A1 | 7/2013 | Bartelme et al. |
| 2013/0255729 | A1 | 10/2013 | Hodge et al. |
| 2013/0284205 | A1 | 10/2013 | Hodge et al. |
| 2014/0148371 | A1 | 5/2014 | Man et al. |
| 2014/0148372 | A1 | 5/2014 | Man et al. |
| 2015/0232793 | A1 | 8/2015 | Hodge et al. |
| 2015/0307817 | A1 | 10/2015 | Peitersen et al. |

FOREIGN PATENT DOCUMENTS

| | | | |
|---|---|---|---|
| CA | 1199808 | A1 | 1/1986 |
| CA | 2101641 | C | 8/1992 |
| CA | 1317875 | C | 5/1993 |
| CA | 2122956 | A1 | 11/1994 |
| CA | 2245537 | C | 8/1997 |

(56) References Cited

FOREIGN PATENT DOCUMENTS

| | | | |
|---|---|---|---|
| CA | 2276364 | A1 | 7/1998 |
| CA | 2339013 | A1 | 2/2000 |
| CA | 2376679 | A1 | 3/2001 |
| CA | 2405977 | A1 | 12/2001 |
| CA | 2447759 | A1 | 12/2002 |
| CA | 2493361 | A1 | 2/2004 |
| CA | 2512324 | A1 | 1/2007 |
| DE | 69918694 | T2 | 7/2005 |
| EP | 0005302 | A2 | 11/1979 |
| EP | 0085327 | A1 | 8/1983 |
| EP | 0202780 | A2 | 11/1986 |
| EP | 0363024 | A1 | 4/1990 |
| EP | 0374458 | A2 | 6/1990 |
| EP | 0411218 | A1 | 2/1991 |
| EP | 0523198 | B1 | 1/1993 |
| EP | 0623052 | A1 | 11/1994 |
| EP | 0787778 | A1 | 8/1997 |
| EP | 1102834 | B1 | 5/2001 |
| EP | 1103017 | B1 | 5/2001 |
| GB | 2306965 | A | 5/1997 |
| JP | 2009111294 | A | 5/2009 |
| JP | 2009296121 | A | 12/2009 |
| WO | 198002024 | A1 | 10/1980 |
| WO | 198911525 | A1 | 11/1989 |
| WO | 199210093 | A1 | 6/1992 |
| WO | 199213448 | A1 | 8/1992 |
| WO | 199314865 | A1 | 8/1993 |
| WO | 199707675 | A1 | 3/1997 |
| WO | 199727748 | A1 | 8/1997 |
| WO | 1997039089 | A1 | 10/1997 |
| WO | 199828975 | A1 | 7/1998 |
| WO | 200005951 | A1 | 2/2000 |
| WO | 200005952 | A1 | 2/2000 |
| WO | 200008125 | A1 | 2/2000 |
| WO | 200046327 | A1 | 8/2000 |
| WO | 200119509 | A1 | 3/2001 |
| WO | 200183879 | A1 | 11/2001 |
| WO | 200202662 | A1 | 1/2002 |
| WO | 200248299 | A1 | 6/2002 |
| WO | 02100374 | A2 | 12/2002 |
| WO | 2002100525 | A2 | 12/2002 |
| WO | 2004010930 | A2 | 2/2004 |
| WO | 2005085321 | A1 | 9/2005 |
| WO | 2007104895 | A1 | 9/2007 |
| WO | 2009143513 | A1 | 11/2009 |
| WO | 2010091333 | A2 | 8/2010 |
| WO | 2010091345 | A2 | 8/2010 |
| WO | 2011036053 | A1 | 3/2011 |
| WO | 2013043699 | A2 | 3/2013 |
| WO | 2013064315 | A1 | 5/2013 |

OTHER PUBLICATIONS

Nalco 625 Liquid Anionic Flocculant, Product Bulletin, Nalco Company, 3 pages, 2014.

Core Shell 61067 Paper Process Polymer, Product Bulletin, Nalco Company, 5 pages, 2014.

Plurafac LF-221 Alcohol Alkoxylate, Technical Bulletin, BASF Corporation, 1 page, 2002.

Bozetine, I., et al., "Optimization of an Alkylpolyglucoside-Based Dishwashing Detergent Formuation", Journal of Surfactants and Detergents (Dec. 2008) 11: pp. 299-305.

Bruschweiler, Dr. H., "Flussigwaschmittel", Tenside Detergents, BASF Corporation (1986) 23, 6 pages.

Crowe, T.G., et al., "Digital Device and Technique for Sensing Distribution of Spray Deposition", American Society of Agricultural Engineers (2005), vol. 48(6), pp. 2085-2093.

Dexter, R.W., "Measurement of Extensional Viscosity of Polymer Solutions and its Effects on Atomization from a Spray Nozzle", Atomization and Sprays, (1996) vol. 6, pp. 167-191.

DOW Personal Care, Kathon CG, "A Safe, Effective, Globally Approved Preservative for Rinse-Off Products", Jun. 2006, 9 pages.

Filipovic-Vincekovic, Dr. N., et al., "Surfactants in Liquid Decontamination Processes", Tenside Surfactants Detergents (1987) 24:3, 6 pages.

Giles, D.K, et al., "Flow Control and Spray Cloud Dynamics From Hydraulic Atomizers", American Society of Agricultural Engineers, (2002) vol. 45(3), pp. 539-546.

Giles, D. Ken, "Independent Control of Liquid Flow Rate and Spray Droplet Size From Hydraulic Atomizers", Atomization and Sprays (1997), vol. 7, pp. 161-181.

Giles, D.K, et al., "Precision Band Spraying with Machine-Vision Guidance and Adjustable Yaw Nozzles", American Society of Agricultural Engineers, (1997) vol. 40(1), pp. 29-36.

Giles, D.K, et al., "Suppression of Aerosol Generation During Spraying and Deposition of Consumer Products", Atomization and Sprays, (2005), vol. 15, pp. 423-438.

Giles, D.K, et al., "Transient Droplet Size Spectra From Trigger Sprayers Dispensing Aqueous Solutions", American Society of Agricultural Engineers, (2005), vol. 48(1), pp. 63-72.

Jadidi, Nazanin, et al., "Synergism and Performance Optimization in Liquid Detergents Containing Binary Mixtures of Anionic-Nonionic, and Anionic-Cationic Surfactants", J. Surfact. Deterg., (2013), 16, pp. 115-121.

Malihi, F.B., et al., "Evaluation of Physico-Chemical Interactions between Linear Alkylbenzene Sulfonate (LAS) and Alcohol Ethoxylates", Physical Chemistry, Tenside Surf. Det. (2011), 48, 5, pp. 395-399.

Raney, Kirk H., "Optimization of Nonionic/Anionic Surfactant Blends for Enhanced Oily Soil Removal", JAOCS (Jul. 1991), vol. 68, No. 7, pp. 525-531.

Rojvoranun, Sureeporn, et al., "Mechanistic Studies of Particulate Soil Detergency: I. Hydrophobic Soil Removal", J. Surfact. Deterg. (2012) 15, pp. 277-289.

Rojvoranun, Sureeporn, et al., "Mechanistic Studies of Particulate Soil Detergency: II. Hydrophobic Soil Removal", J. Surfact. Deterg. (2012) 15, pp. 663-677.

Zoid, T. Ahmed, et al., "Response Surface Methodology as an Approach to the Optimization of a Dishwashing Detergent", Tenside Surf. Det. (2007) 44:2, pp. 94-101.

* cited by examiner

REDUCED MISTING ACIDIC CLEANING, SANITIZING, AND DISINFECTING COMPOSITIONS VIA THE USE OF HIGH MOLECULAR WEIGHT WATER-IN-OIL EMULSION POLYMERS

CROSS-REFERENCE TO RELATED APPLICATIONS

This application claims priority and is related to U.S. Provisional Application Ser. No. 62/340,079 filed on May 23, 2016 and entitled Reduced Misting Cleaning, Sanitizing, and Disinfecting Compositions via the Use of High Molecular Weight Water-in-Oil Emulsion Polymers. The entire contents of this patent application are hereby expressly incorporated herein by reference including, without limitation, the specification, claims, and abstract, as well as any figures, tables, or drawings thereof.

This application is also related to U.S. patent application Ser. No. 15/602,535, entitled Reduced Misting Alkaline and Neutral Cleaning, Sanitizing, and Disinfecting Compositions via the Use of High Molecular Weight Water-in-Oil Emulsion Polymers, filed concurrently herewith. The entire contents of this patent application are hereby expressly incorporated herein by reference including, without limitation, the specification, claims, and abstract, as well as any figures, tables, or drawings thereof.

FIELD OF THE INVENTION

The present invention is related to the field of sprayable aqueous compositions for cleaning, sanitizing and disinfecting. The present invention is further related to sprayable aqueous compositions, including for example aerosol or pump spray, providing the benefits of reduced misting and therefore reduced inhalation. The sprayable aqueous compositions include an inverse emulsion (water-in-oil) polymer for modifying the unique rheology of the use solution resulting in low shear viscosity and high elongational viscosity, allowing decreased strain of trigger spray and reduced trigger spraying. Moreover, manufacturing benefits of in-line mixing and on-site formulation, ease in dilution and use, and increased speed of action on soils. In particular, the present invention provides compositions and methods of cleaning having reduced amounts of airborne particles of the composition during spray applications.

BACKGROUND OF THE INVENTION

Acidic and alkaline cleaning compositions for hard surfaces have been used for many years to remove stubborn soils from a variety of surfaces found in household and institutional locations. A variety of cleaning compositions have been developed to deal with the tenacious organic and organic/inorganic matrix soils common in a variety of surfaces. One particularly useful form of cleaner is an aqueous alkaline cleaner commonly delivered from a pressurized aerosol or pump spray device. These types of cleaners have great utility for a variety of surfaces because the material can be delivered by spray to vertical, overhead or inclined surfaces or to surfaces having a complex curved or convoluted surface while achieving substantially complete coverage of the surface with the spray-on liquid cleaner. Acid spray-on cleaners are also known for removing basic inorganic soils and are becoming more common.

Spray devices create a spray pattern of the composition that contacts the target hard surface. The majority of the composition comes to reside on the target surface, while a small portion of the sprayable composition may become an airborne aerosol or mist consisting of small particles (e.g. an airborne mist or finely divided aerosol) of the cleaning composition that can remain suspended or dispersed in the atmosphere surrounding the dispersal site for a period of time, such as between about 5 seconds to about 10 minutes. Such airborne mist or finely divided aerosol generated during the spraying process can present a substantial problem Such aqueous compositions having a strong base cleaning component in the form of a finely divided aerosol or mist can cause respiratory distress in a user. To alleviate the respiratory distress, some sprayable aqueous compositions have been formulated with reduced quantities of the alkaline cleaning components. Strong caustic has been replaced by reduced alkalinity bases such as bicarbonate or by solvent materials. However, the reduction in concentration or substitution of these materials can often reduce the cleaning activity and effectiveness of the material when used. This necessitates the use of organic surfactants or glycol, alkyl ether or dimethyl sulfoxide solvent materials to enhance the detergent properties of the reduced alkaline materials. Despite improvements seen in sprayable aqueous compositions there remains a need for improved compositions having reduced misting and therefore reduced inhalation, while providing efficacious cleaning, sanitizing and disinfecting.

Development and improvements to polymers for various uses include those disclosed in EP 202,780 disclosing particulate cross-linked copolymers of acrylamide with at least 5 mole percent dialkylaminoalkyl acrylate; U.S. Pat. No. 4,950,725 disclosing the addition of a cross-linking agent both at the beginning, and during the polymerization process under conditions such that its availability for reaction is substantially constant throughout the process; EP 374,458 disclosing water-soluble branched high molecular weight cationic polymers; EP 363,024 disclosing chain transfer agent at the conclusion of polymerization of a DADMAC/acrylamide copolymer; U.S. Pat. No. 4,913,775 disclosing use of substantially linear cationic polymers such as acrylamide/dimethylaminoethyl acrylate methyl chloride quaternary salt copolymers; U.S. Pat. No. 5,393,381 disclosing branched cationic polyacrylamide powder such as an acrylamide/dimethylaminoethyl acrylate quaternary salt copolymer; and WO2002002662 disclosing water-soluble cationic, anionic, and nonionic polymers, synthesized using water-in-oil emulsion, dispersion, or gel polymerization and having a fast rate of solubilization, higher reduced specific viscosities.

Accordingly, it is an objective of the claimed invention to develop compositions having reduced misting, anti-mist and/or particle size control for chlorine-free hard surface cleaners.

A further object of the invention is a reduced misting product to reduce and/or eliminate exposure to users of the cleaning composition to mist or other small particles generated by the spraying of the cleaning composition.

A further object of the invention is a reduced misting product suitable for formulation using inverse emulsion polymers in neutral, acidic and/or alkaline formulations, including oxidizing formulations.

A still further object of the invention is to provide methods of cleaning using the inverse emulsion polymer compositions to treat hard surfaces while reducing the amount of mist or other small particles generated by the spraying of the composition.

Other objects, advantages and features of the present invention will become apparent from the following specification taken in conjunction with the accompanying drawings.

BRIEF SUMMARY OF THE INVENTION

An advantage of the invention is provided by the sprayable aqueous compositions comprising inverse emulsion (water-in-oil) polymer(s) for modifying the rheology of the use solution compositions to provide low shear viscosity and high elongational viscosity. It is an advantage that such rheology modification reduces misting when spraying the neutral, acid or alkaline cleaning compositions. It is a further advantage that such rheology modification reduces strain of trigger spray when spraying the neutral, acid or alkaline cleaning compositions.

In an embodiment, the present invention provides sprayable cleaning compositions with reduced misting comprising an effective cleaning amount of an alkalinity source, acid source and/or oxidizing source for the applicable cleaning composition, a high molecular weight inverse emulsion polymer, at least one surfactant, and water. In an aspect, the cleaning compositions reduce the formation of airborne aerosol particles having a micron size of less than about 10 when sprayed (i.e. inhalable particles).

In a further embodiment, the present invention provides a system for applying a cleaning composition producing reduced misting upon spraying, the system comprising: a sprayer comprising a spray head connected to a spray bottle; and an aqueous, ready-to-use cleaning composition contained by the spray bottle and the spray head adapted to dispense the aqueous composition.

In a still further embodiment, the present invention provides methods of cleaning a hard surface using a sprayed, reduced misting, aqueous cleaning composition comprising: contacting a soiled surface with an aqueous cleaning composition; and wiping the hard surface to remove the treating film and any soil.

In a still further embodiment, methods of making the sprayable neutral, alkaline or acidic cleaning compositions, including oxidizing compositions, with reduced misting are provided.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
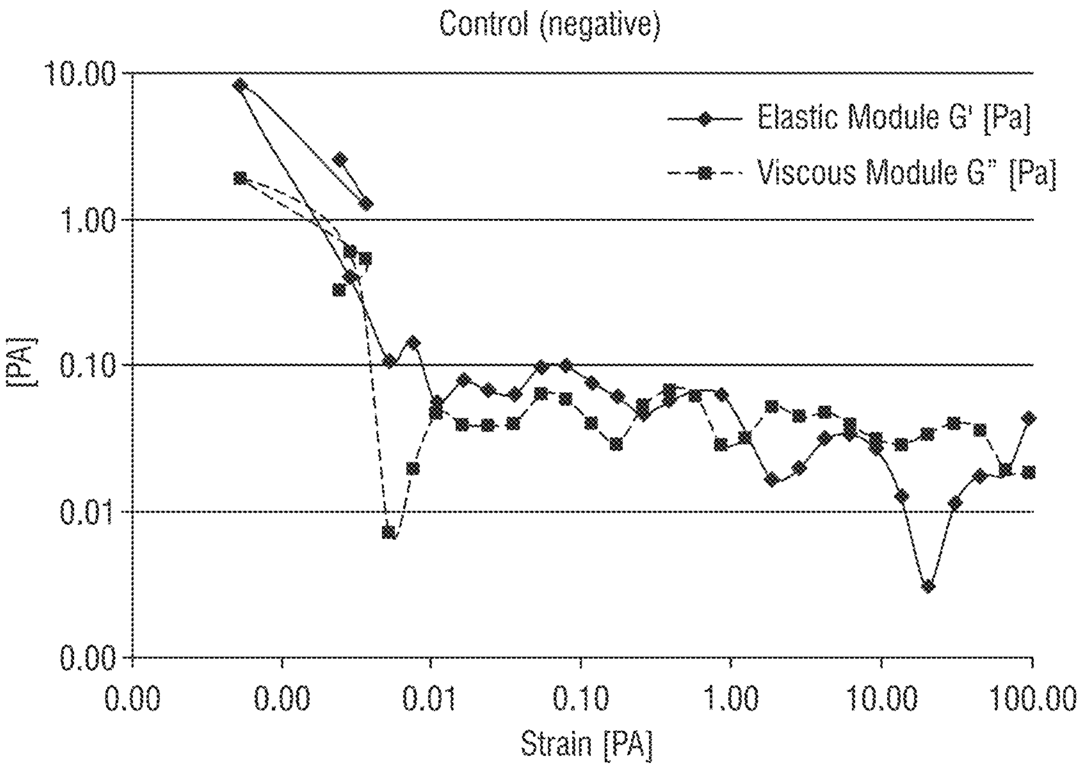
FIGS. 1-5 show viscoelasticity measurements set forth in Example 2 for sanitizing compositions including: Control (negative) (FIG. 1); Control (positive) (FIG. 2); Formulation 2 containing inverse emulsion polymer (FIG. 3); Formulation 3 containing inverse emulsion polymer (FIG. 4); and Formulation 4 containing inverse emulsion polymer (FIG. 5).

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION OF THE PREFERRED EMBODIMENT

The present invention relates to reduced misting hard surface cleaning compositions. The reduced misting cleaning compositions containing inverse emulsion polymers have many advantages over conventional sprayable cleaning compositions. For example, the compositions reduce particulate matter and therefore inhalation by a user. In an aspect of the invention, the cleaning composition solutions containing inverse emulsion polymers are delivered in micron sized particles that reduce inhalation, such as for example by delivering compositions at a particle size of at least about 10 microns to minimize the inhalation of particles. In a further aspect, the cleaning composition solutions produces a total concentration of misting of particles having a size of 10 microns or less within a breathing zone of a user of less than or equal to 60 particles/$cm^3$.

The embodiments of this invention are not limited to particular compositions, methods of making and/or methods of employing the same for hard surface cleaning, which can vary and are understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form.

Numeric ranges recited within the specification are inclusive of the numbers defining the range and include each integer within the defined range. Throughout this disclosure, various aspects of this invention are presented in a range format. It should be understood that the description in range format is merely for convenience and brevity and should not be construed as an inflexible limitation on the scope of the invention.

Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

So that the present invention may be more readily understood, certain terms are first defined. Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. The term "about" also encompasses amounts that differ due to different equilibrium conditions for a composition resulting from a particular initial mixture. Whether or not modified by the term "about", the claims include equivalents to the quantities.

The term or abbreviation "AcAm" refers to acrylamide.

The term "actives" or "percent actives" or "percent by weight actives" or "actives concentration" are used interchangeably herein and refers to the concentration of those ingredients involved in cleaning expressed as a percentage minus inert ingredients such as water or salts.

As used herein, the terms "active chlorine", "chlorine", and "hypochlorite" are all used interchangeably and are intended to mean measureable chlorine available in a use solution as evaluated by standard titration techniques known to those of skill in the art. In a preferred aspect, the inverse emulsion polymer compositions provide chlorine-free cleaning compositions.

As used herein, the terms "aerosol" and "mist" refer to airborne dispersions of small particles comprising the cleaning composition that can remain suspended or dispersed in the atmosphere surrounding a cleaning site for at least 5 seconds, more commonly 15 seconds to 10 minutes.

As used herein, the term "cleaning" refers to a method used to facilitate or aid in soil removal, bleaching, microbial population reduction, and any combination thereof. As used herein, the term "microorganism" refers to any noncellular or unicellular (including colonial) organism. Microorganisms include all prokaryotes. Microorganisms include bacteria (including cyanobacteria), spores, lichens, fungi, protozoa, virinos, viroids, viruses, phages, and some algae. As used herein, the term "microbe" is synonymous with microorganism.

The term or abbreviation "DADMAC" refers to diallyldimethylammonium chloride.

The term or abbreviation "DMAEA" refers to dimethylaminoethyl acrylate.

The term or abbreviation "DMAEM" refers to dimethylaminoethyl methacrylate.

The term or abbreviation "DMAEA BCQ" refers to dimethylaminoethyl acrylate, benzyl chloride quaternary salt.

The term or abbreviation "DMAEA'MCQ" refers to dimethylaminoethyl acrylate, methyl chloride quaternary salt.

As used herein, the term "disinfectant" refers to an agent that kills all vegetative cells including most recognized pathogenic microorganisms, using the procedure described in *A.O.A.C. Use Dilution Methods*, Official Methods of Analysis of the Association of Official Analytical Chemists, paragraph 955.14 and applicable sections, 15th Edition, 1990 (EPA Guideline 91-2). As used herein, the term "high level disinfection" or "high level disinfectant" refers to a compound or composition that kills substantially all organisms, except high levels of bacterial spores, and is effected with a chemical germicide cleared for marketing as a sterilant by the Food and Drug Administration. As used herein, the term "intermediate-level disinfection" or "intermediate level disinfectant" refers to a compound or composition that kills mycobacteria, most viruses, and bacteria with a chemical germicide registered as a tuberculocide by the Environmental Protection Agency (EPA). As used herein, the term "low-level disinfection" or "low level disinfectant" refers to a compound or composition that kills some viruses and bacteria with a chemical germicide registered as a hospital disinfectant by the EPA.

The term or abbreviation "EDTA 4Na+" refers to ethylenediaminetetraacetic acid, tetrasodium salt.

The term "hard surface" refers to a solid, substantially non-flexible surface such as a counter top, tile, floor, wall, panel, window, plumbing fixture, kitchen and bathroom furniture, appliance, engine, circuit board, and dish. Hard surfaces may include for example, health care surfaces and food processing surfaces.

As used herein, the phrase "health care surface" refers to a surface of an instrument, a device, a cart, a cage, furniture, a structure, a building, or the like that is employed as part of a health care activity. Examples of health care surfaces include surfaces of medical or dental instruments, of medical or dental devices, of electronic apparatus employed for monitoring patient health, and of floors, walls, or fixtures of structures in which health care occurs. Health care surfaces are found in hospital, surgical, infirmity, birthing, mortuary, and clinical diagnosis rooms. These surfaces can be those typified as "hard surfaces" (such as walls, floors, bed-pans, etc.), or fabric surfaces, e.g., knit, woven, and non-woven surfaces (such as surgical garments, draperies, bed linens, bandages, etc.), or patient-care equipment (such as respirators, diagnostic equipment, shunts, body scopes, wheel chairs, beds, etc.), or surgical and diagnostic equipment. Health care surfaces include articles and surfaces employed in animal health care.

As used herein, the phrase "food processing surface" refers to a surface of a tool, a machine, equipment, a structure, a building, or the like that is employed as part of a food processing, preparation, or storage activity. Examples of food processing surfaces include surfaces of food processing or preparation equipment (e.g., slicing, canning, or transport equipment, including flumes), of food processing wares (e.g., utensils, dishware, wash ware, and bar glasses), and of floors, walls, or fixtures of structures in which food processing occurs. Food processing surfaces are found and employed in food anti-spoilage air circulation systems, aseptic packaging sanitizing, food refrigeration and cooler cleaners and sanitizers, ware washing sanitizing, blancher cleaning and sanitizing, food packaging materials, cutting board additives, third-sink sanitizing, beverage chillers and warmers, meat chilling or scalding waters, auto dish sanitizers, sanitizing gels, cooling towers, food processing antimicrobial garment sprays, and non-to-low-aqueous food preparation lubricants, oils, and rinse additives.

As used herein, the term "monomer" for an inverse emulsion polymer means a polymerizable allylic, vinylic or acrylic compound. The monomer may be anionic, cationic or nonionic. In some embodiments vinyl monomers are preferred, and in other embodiments acrylic monomers are more preferred.

For the purpose of this patent application, successful microbial reduction is achieved when the microbial populations are reduced by at least about 50%, or by significantly more than is achieved by a wash with water. Larger reductions in microbial population provide greater levels of protection.

As used herein, the term "sanitizer" refers to an agent that reduces the number of bacterial contaminants to safe levels as judged by public health requirements. In an embodiment, sanitizers for use in this invention will provide at least a 99.999% reduction (5-log order reduction). These reductions can be evaluated using a procedure set out in *Germicidal and Detergent Sanitizing Action of Disinfectants*, Official Methods of Analysis of the Association of Official Analytical Chemists, paragraph 960.09 and applicable sections, 15th Edition, 1990 (EPA Guideline 91-2). According to this reference a sanitizer should provide a 99.999% reduction (5-log order reduction) within 30 seconds at room temperature, 25±2° C., against several test organisms.

Differentiation of antimicrobial "-cidal" or "-static" activity, the definitions which describe the degree of efficacy, and the official laboratory protocols for measuring this efficacy are considerations for understanding the relevance of antimicrobial agents and compositions. Antimicrobial compositions can affect two kinds of microbial cell damage. The first is a lethal, irreversible action resulting in complete microbial cell destruction or incapacitation. The second type of cell damage is reversible, such that if the organism is rendered free of the agent, it can again multiply. The former is termed microbiocidal and the later, microbistatic. A sanitizer and a disinfectant are, by definition, agents which provide antimicrobial or microbiocidal activity. In contrast, a preservative is generally described as an inhibitor or microbistatic composition As used herein, the term "substantially free" refers to compositions completely lacking the component or having such a small amount of the component that the component does not affect the performance of the composition. The component may be present as an impurity or as a contaminant and shall be less than 0.5 wt-%. In another embodiment, the amount of the component is less than 0.1 wt-% and in yet another embodiment, the amount of component is less than 0.01 wt-%.

The term "viscosity" is used herein to describe a property of the sprayable aqueous compositions for cleaning, sanitizing and disinfecting according to the invention. As one skilled in the art understands, both dynamic (shear) viscosity and bulk viscosity can be used to describe characteristics of the compositions. The shear viscosity of a liquid describes its resistance to shearing flows. The bulk viscosity of a liquid describes its ability to exhibit a form of internal friction that resists its flow without shear. The measurements of viscosity described herein use the physical until of poise (P) or centipoise (cPs).

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

The methods and compositions of the present invention may comprise, consist essentially of, or consist of the components and ingredients of the present invention as well as other ingredients described herein. As used herein, "consisting essentially of" means that the methods and compositions may include additional steps, components or ingredients, but only if the additional steps, components or ingredients do not materially alter the basic and novel characteristics of the claimed methods and compositions.

Reduced Misting Cleaning Compositions

The sprayable aqueous cleaning compositions according to the invention are suitable for packaging in pressurized aerosol spray units using commonly available pressure containers, aerosol valves and aerosol propellants. The sprayable aqueous cleaning compositions according to the invention can further be used in a pump spray format using a pump spray head and a suitable container. The various formulations of the aqueous cleaning compositions are typically applied to hard surfaces containing difficult inorganic, organic, or matrix-blended soils. Such soils include baked-on or carbonized food residues. Other surfaces can contain soils derived from substantially insoluble hardness components of service water. The sprayable aqueous cleaning compositions of the invention rapidly remove such soils due to the unique combination of the inverse emulsion polymers and surfactants that can rapidly remove the soils but resist formation of an amount of mist or aerosol during application that can cause respiratory distress.

The present invention relates to reduced-misting sprayable aqueous cleaning compositions comprising, consisting of or consisting essentially of at least an inverse emulsion polymer, a surfactant (surfactant system), an alkalinity, acidity and/or oxidizing source, and additional functional ingredients, such as for example, solvents. In some embodiments, the sprayable compositions may be dispensed with a trigger sprayer, such as non-low velocity or a low velocity trigger sprayer. The sprayable compositions may be dispensed in alternative manners as well. The reduced-misting sprayable aqueous cleaning compositions provide ease in manufacturing as a result of the rapid dispersion of the inverse emulsion polymer into homogenous solutions. The reduced-misting sprayable aqueous cleaning compositions provide further benefits in addition to the ease in manufacturing, including for example, ease in application when using spray applications due to the reduced viscosity profiles allowing ease of use with spray triggers. Still further, the reduced-misting sprayable aqueous cleaning compositions provide little to no misting of the formulations and increased rate of cleaning in comparison to compositions comprising conventional thickeners, such as xanthan gum.

The sprayable cleaning composition may be referred to as a non-Newtonian fluid. Newtonian fluids have a short relaxation time and have a direct correlation between shear and elongational viscosity (the elongational viscosity of the fluid equals three times the shear viscosity). Shear viscosity is a measure of a fluid's ability to resist the movement of layers relative to each other. Elongational viscosity, which is also known as extensional viscosity, is a measure of a fluid's ability to stretch elastically under elongational stress. Non-Newtonian fluids do not have a direct correlation between shear and elongational viscosity and are able to store elastic energy when under strain, giving exponentially more elongational than shear viscosity and producing an effect of thickening under strain (i.e., shear thickening). These properties of non-Newtonian fluids result in the sprayable composition that has a low viscosity when not under shear but that thickens when under stress from the trigger sprayer forming larger droplets.

In an aspect and without being limited to a particular mechanism of action according to the invention the sprayable cleaning compositions provide non-Newtonian fluids resulting in a sprayable composition that has a low viscosity when not under shear and that thickens when under stress from a sprayer, such as a trigger sprayer forming larger droplets. The present invention provides a significant benefit over conventional formulations attempting to formulate using xantham gums for a concentrate for dilution concentrate product, which result in products with viscosity too think that would render it unable to be pumped or aspirated when employing sufficient concentration of the xantham gum to make a use dilution with enough of the xanthan gum to provide the desired anti-misting properties. Beneficially, the non-Newtonian fluids according to the present invention provide concentrate products for dilution which are thin enough to pump to create a use dilution while having elongational viscosity for anti-misting properties when sprayed.

In some embodiments the sprayable cleaning composition has a relatively low shear viscosity when not under strain. In an embodiment, the shear viscosity of the sprayable cleaning composition containing the inverse emulsion polymer(s) is comparable to the shear viscosity of water and may be referred to as a "thin liquid". A suitable shear viscosity for the sprayable cleaning compositions containing the inverse emulsion polymer(s) is from about 1 to about 1500 cPs, or from about 1 to about 1000 cPs. As one skilled in the art will ascertain, the high molecular weight inverse emulsion polymers can be employed to generate super concentrate compositions, wherein a use composition is then formulated for a dispensing system that can be sprayed. In a preferred aspect, the shear viscosity for the sprayable cleaning compositions in a use solution is from about 1 to about 500 cPs, from about 1 to about 200 cPs, preferably from about 1 to about 100 cPs, or preferably from about 1 to about 50 cPs. In one example, the anti-mist components, namely the high molecular weight inverse emulsion polymers, do not increase the shear viscosity of the sprayable composition when not under strain and the increased shear viscosity is created by other components, such as a surfactant. In an aspect, the high molecular weight inverse emulsion polymers do not increase the shear viscosity of the sprayable composition more than about 10%, more than about 9%, more than about 8%, more than about 7%, more than about 6%, more than about 5%, more than about 4%, more than about 3%, more than about 2%, or more than about 1%. Without being limited according to a mechanism of action, the inclusion of the very flexible and high molecular weight inverse emulsion polymers at a low concentration do not result in a significant increase in the shear viscosity of the sprayable composition. In comparison, to achieve the same anti-misting efficacy with conventional thickening agents a much greater concentration is required and would cause significant increase in viscoelasticity of the compositions, and in most instances would not permit a spraying composition as achieved according to the present invention. As a skilled artisan will appreciate, the additional components of a sprayable composition can significantly increase the shear viscosity, such as the alkalinity source, surfactants and the like.

The present invention provides an unexpected benefit in the viscosity of the anti-mist compositions as a result of the flexible viscoelastic compositions afforded by the inverse emulsion polymers. These benefits provide a stark constrast to the conventional use of xanthan gum often employed to provide viscoelasticity for compositions; however such xanthan gum requires a high concentration to provide any desired viscoelasticity and even then provides a far more rigid structure and has a higher sheer viscosity in comparison to the polymers and compositions of the invention, rendering the xanthan gum unable for use in concentrate products which require dilution. Instead, the xanthan gum is only available for use in ready to use products.

In some embodiments the median particle size of the dispensed solution of the reduced-misting sprayable aqueous cleaning compositions is sufficiently large to reduce misting. As one skilled in the art appreciates, particles having droplet size of less than about 10 microns can be readily inhaled. Moreover, particles having droplet size of less than about 0.1 microns can be readily inhaled into the lungs. Therefore, in many aspects of the invention the testing and evaluation of the sprayable compositions according to the invention focus on the reduction of misting, in particular reduction or elimination of micron sizes of about 10 or less. In an aspect of the invention, a suitable median particle size is about 11 microns or greater, 50 microns or greater, 70 microns or greater, about 10 microns or greater, about 150 microns or greater, or about 200 microns or greater. The suitable median particle size may depend on the composition of the RTU. For example, a suitable median particle size for a strongly alkaline or acidic use solution may be about 100 microns or greater, and more particularly about 150 microns or greater, and more particularly about 200 microns or greater. A suitable median particle size for a moderately alkaline or acidic RTU may be about 11 microns or greater, preferably about 50 microns or greater, and more preferably about 150 microns or greater.

The sprayable cleaning compositions according to the invention beneficially provide stable compositions wherein the inverse emulsion polymer retains stability for at least about one year at ambient temperature, or at least about two years at ambient temperature. The stability is measured by the maintained anti-misting properties of the sprayable cleaning compositions.

EMBODIMENTS

Exemplary ranges of the ready-to-use cleaning compositions according to the invention are shown in Table 1, Table 2 (alkaline compositions) and Table 3 (acidic compositions) each in weight percentage.

TABLE 1

(general)

| Material | First Exemplary Range wt-% | Second Exemplary Range wt-% | Third Exemplary Range wt-% | Fourth Exemplary Range wt-% |
|---|---|---|---|---|
| Inverse Emulsion Polymer | 0.0001-1 | 0.0005-0.5 | 0.001-0.2 | 0.01-0.2 |
| Alkalinity, Acidity and/or Oxidizing Source | 0.1-50 | 0.1-40 | 1-40 | 5-40 |
| Surfactants | 0.1-25 | 0.5-20 | 1-15 | 1-10 |

TABLE 1-continued (general)

| Material | First Exemplary Range wt-% | Second Exemplary Range wt-% | Third Exemplary Range wt-% | Fourth Exemplary Range wt-% |
|---|---|---|---|---|
| Water | 25-99 | 40-98 | 40-90 | 50-90 |
| Additional Functional Ingredients | 0-50 | 0-25 | 0-20 | 0-10 |

TABLE 2

(alkaline compositions)

| Material | First Exemplary Range wt-% | Second Exemplary Range wt-% | Third Exemplary Range wt-% | Fourth Exemplary Range wt-% |
|---|---|---|---|---|
| Inverse Emulsion Polymer | 0.0001-1 | 0.0005-0.5 | 0.001-0.2 | 0.01-0.2 |
| Alkalinity and/or Oxidizing Source | 0.1-25 | 0.1-20 | 1-20 | 5-15 |
| Surfactants | 0.1-25 | 0.5-20 | 1-15 | 1-10 |
| Water | 25-99 | 50-90 | 60-90 | 70-90 |
| Additional Functional Ingredients | 0-50 | 0-25 | 0-20 | 0-10 |

TABLE 3

(acidic compositions)

| Material | First Exemplary Range wt-% | Second Exemplary Range wt-% | Third Exemplary Range wt-% | Fourth Exemplary Range wt-% |
|---|---|---|---|---|
| Inverse Emulsion Polymer | 0.0001-1 | 0.0005-0.5 | 0.001-0.2 | 0.01-0.2 |
| Acidity Source | 0.1-50 | 1-40 | 5-40 | 10-40 |
| Surfactants | 0.1-25 | 0.5-20 | 1-15 | 1-10 |
| Water | 25-99 | 25-70 | 40-70 | 40-60 |
| Additional Functional Ingredients | 0-50 | 0-25 | 0-20 | 0-10 |

Inverse Emulsion Polymer

The reduced-misting sprayable aqueous cleaning compositions according to the invention include an inverse emulsion polymer. In an aspect, the inverse emulsion polymer is a water-soluble modified polymer. In an aspect, the inverse emulsion polymer may be cationic, anionic, nonionic, amphoteric and/or associative. The terms emulsion polymer and latex polymer may be used interchangeably herein, referring to a water-in-oil (W/O) emulsion polymer comprising a cationic, anionic, nonionic, and/or zwitterionic polymer.

In an aspect, the inverse emulsion polymer has a molecular weight of from about 3,000 Da to about 50 million Da, from about 500,000 Da to about 30 million Da, from about 1 million Da to about 25 million Da, and preferably from about 3 million Da to about 20 million Da.

In an aspect, reduced specific viscosity of the inverse emulsion polymer is generally above 3, preferably above about 8 and frequently above about 24 dl/g.

In an aspect, the inverse emulsion polymers according to the invention have a particle size ranging from about 0.1 to about 10 microns, preferably from about 0.25 to about 3 microns.

In an aspect, the inverse emulsion polymers according to the invention have a bulk viscosity of ranging from about 50-5000 cPs, and preferably from about 100-2000 cPs.

The inverse emulsion polymers according to the invention are stabilized dispersions of flexible polymer chains containing aqueous droplets in an inert hydrophobic phase. In an aspect, the inverse emulsion polymers are comprised of three components including (1) a hydrophobic or hydrocarbon continuous oil phase, (2) an aqueous phase, and (3) a water-in-oil emulsifying agent (i.e. surfactant system). In an aspect, the inverse emulsion polymers are hydrocarbon continuous with the water-soluble polymers dispersed within the hydrocarbon matrix. The inverse emulsion polymers are then "inverted" or activated for use by releasing the polymer from the particles using shear, dilution, and, generally, another surfactant. See U.S. Pat. No. 3,734,873 which is incorporated herein by reference. Representative preparations of high molecular weight inverse emulsion polymers are described in U.S. Pat. Nos. 2,982,749; 3,284,393, and 3,734,873, each of which are incorporated herein by reference.

In another aspect, an inverse emulsion polymer are formed through the polymerization of an aqueous solution of monomers under free radical polymerization conditions to form a polymer solution, as disclosed in U.S. Pat. Nos. 6,605,674 and 6,753,388, each of which are incorporated herein by reference. In a preferred aspect, the inverse emulsion polymer is obtained by polymerizing an aqueous solution of ethylenically unsaturated water-soluble or water-dispersible monomers and/or comonomers emulsified in a hydrophobic continuous phase by using oil- and/or water soluble initiators via radical polymerization.

As used herein, the term "monomer" for an inverse emulsion polymer means a polymerizable allylic, vinylic or acrylic compound. The monomer may be anionic, cationic, nonionic and/or zwitterionic. In some embodiments vinyl monomers are preferred, and in other embodiments acrylic and/or acrylamide monomers, such as acrylic acid or its salts, N-t-butyl acrylamide sulfonic acid (ATBS) or its salts, acrylamide tertiary butyl sulfonic acid or its salts, and 2-(acryloyloxy)-N,N,N-trimethylethananminium (DMAE-A.MCQ), are more preferred.

In an embodiment, nonionic monomers are particularly suitable for use in neutral, acidic, alkaline and/or oxidizing cleaning compositions. Representative nonionic, water-soluble monomers include acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-tert-butylacrylamide, N-methylolacrylamide, and the like.

In an embodiment, anionic monomers are particularly suitable for use in alkaline, neutral and/or oxidizing cleaning compositions. Representative anionic monomers include acrylic acid, and its salts, including, but not limited to sodium acrylate, and ammonium acrylate, methacrylic acid, and its salts, including, but not limited to sodium methacrylate, and ammonium methacrylate, 2-acrylamido-2-methylpropanesulfonic acid (ATBS), the sodium salt of ATBS, acrylamide tertiary butyl sulfonic acid or its salts, sodium vinyl sulfonate, styrene sulfonate, maleic acid, and its salts, including, but not limited to the sodium salt, and ammonium salt, sulfonate itaconate, sulfopropyl acrylate or methacrylate or other water-soluble forms of these or other polymerizable carboxylic or sulphonic acids. Sulfomethylated acrylamide, allyl sulfonate, sodium vinyl sulfonate, itaconic acid, acrylamidomethylbutanoic acid, fumaric acid, vinylphosphonic acid, vinylsulfonic acid, allylphosphonic acid, sulfomethylated acrylamide, phosphonomethylated acrylamide, and the like.

In an embodiment, cationic monomers are particularly suitable for use in acidic and/or oxidizing cleaning compositions. Representative cationic monomers include dialkylaminoalkyl acrylates and methacrylates and their quaternary or acid salts, including, but not limited to, dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminoethyl acrylate methyl chloride quaternary salt, dimethylaminoethyl acrylate benzyl chloride quaternary salt, dimethylaminoethyl methacrylate methyl chloride quaternary salt, dimethylaminoethyl methacrylate benzyl chloride quaternary salt, methacrylarnidopropyl trimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethylaminoethylmethacrylate, diallyldiethylammonium chloride, diallyldimethylammonium chloride, and the like.

In an embodiment, zwitterionic monomers are particularly suitable for use in neutral, acidic, alkaline and/or oxidizing cleaning compositions. Representative zwitterionic monomers include N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl)dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxyethyl phosphorylcholine (MPC), 2-[(3-acrylamidopropyl)dimethylammonio] ethyl 2'-isopropyl phosphate (AAPI), 1-vinyl-3-(3-sulfopropyl)imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl)ammonium betaine, and the like.

In an aspect, the aqueous phase is prepared by mixing together in water one or more water-soluble monomers, and any polymerization additives such as inorganic or hydrophobic salts, chelants, pH buffers, processing aids, and the like. In an embodiment, the monomers are ethylenically unsaturated water-soluble or water-dispersible monomers and/or comonomers. In a further embodiment, the monomers are emulsified in a hydrophobic or hydrocarbon continuous oil phase by using oil- and/or water soluble initiators via radical polymerization, wherein the polymers may be nonionic, anionic, cationic, and/or zwitterionic. In a preferred embodiment, the monomers are selected from acrylamide or methacrylamide, such as acrylic acid or its salts, N-t-butyl acrylamide sulfonic acid (ATBS) or its salts, acrylamide tertiary butyl sulfonic acid or its salts, or 2-(acryloyloxy)-N,N,N-trimethylethananminium (DMAEA.MCQ). In a further preferred embodiment, the monomers are further selected from the group consisting of diallyldimethylammonium chloride, dimethylaminoethyl acrylate methyl chloride quaternary salt, acrylamidopropyltrimethylammonium chloride, dimethylaminoethyl methacrylate methyl chloride quaternary salt, methacrylamidopropyltrimethylammonium chloride, acrylic acid, sodium acrylate, ammonium acrylate, methacrylic acid, sodium methacrylate, and ammonium methacrylate.

In a preferred embodiment, the monomers are acrylamide and diallyldimethylammonium chloride. In a further preferred embodiment, the monomers are acrylamide and dimethylaminoethylacrylate methyl chloride quaternary salt. In a further preferred embodiment, the monomers are acrylamide, dimethylaminoethylacrylate benzyl chloride quaternary salt and dimethylaminoethylacrylate methyl chloride quaternary salt. Representative copolymers of acrylic acid and acrylamide useful as microparticles include Nalco® 8677 PLUS, available from Nalco Chemical Company, Naperville, Ill., USA. Other copolymers of acrylic acid and acrylamide are described in U.S. Pat. No. 5,098,520, incorporated herein by reference.

The degree of polymerization of monomers in the aqueous phase is determined by the change in the reaction density for water-in-oil emulsion polymerization, calorimeterically by measuring the heat of reaction, by quantitative infrared spectroscopy, or chromatographically, by measuring the level of unreacted monomer.

In an aspect, the aqueous phase is added to the oil phase (under high shear mixing or vigorous stirring) to form an emulsion.

The hydrophobic/hydrocarbon (or oil) phase is prepared by mixing together an inert hydrocarbon liquid with one or more oil soluble surfactants. The hydrophobic liquid are selected from the group consisting of benzene, xylene, toluene, mineral oils, kerosene, napthas, petroleums and combinations of the same. In a preferred aspect, the hydrophobic liquid is a isoparafinic hydrocarbon. The surfactant mixture should have a low HLB, to ensure the formation of an oil continuous emulsion. Appropriate surfactants for water-in-oil emulsion polymerizations, which are commercially available, are compiled in the North American Edition of McCutcheon's Emulsifiers & Detergents, which is incorporated by reference in its entirety.

In an aspect, the inverse emulsion polymer is a free-flowing liquid. An aqueous solution of the inverse emulsion polymer, in simplest methodology, can be generated by adding a desired amount of the emulsion polymer to water with vigorous mixing in the presence of a high-HLB surfactant as described in U.S. Pat. No. 3,734,873 which is herein incorporated by reference in its entirety.

An effective amount of the inverse emulsion polymer is provided to the cleaning compositions to provide ready-to-use reduced misting compositions having lower concentrations that conventional viscosity-modifying polymers. Beneficially, the inverse emulsion polymers are highly concentrated for dilution systems while maintaining viscoelasticity even for such highly concentrated formulations. Suitable concentrations of the inverse emulsion polymer include between about 0.0001% and about 1% by weight, between about 0.0005% and about 0.5% by weight, between about 0.01% and about 0.2% by weight, and more preferably between about 5 ppm and 200 ppm active inverse emulsion polymer. Without being limited according to the invention, all ranges recited are inclusive of the numbers defining the range and include each integer within the defined range.

Alkalinity and/or Acidity Source

Beneficially, the reduced-misting sprayable aqueous cleaning compositions according to the invention are suitable for both neutral, alkaline and acidic cleaning compositions. As a result, the inverse emulsion polymers disclosed herein provide a universal reduced-misting cleaning composition suitable for various applications of use requiring either alkaline or acidic cleaning compositions.

Alkalinity Source

In an aspect, the sprayable cleaning composition includes an alkalinity source. The source of alkalinity can be a base material or an organic source or an inorganic source of alkalinity. For the purposes of this invention, a source of alkalinity also known as a basic material is a composition that can be added to an aqueous system and result in a pH greater than about 7. In preferred aspects of the invention, an alkaline pH of at least about 10 is employed within the sprayable cleaning composition. Accordingly, the alkalinity source is added to an aqueous system according to the invention to provide an alkaline pH of at least about 10, at least about 11, at least about 11.5, at least about 12, at least about 13, or at least about 13.5, preferably from about 11 to about 13.5, more preferably from about 11.5 to about 13.5, or still more preferably from about 12 to about 13.5.

As one skilled in the art would refer to the sprayable cleaning compositions according to the invention, a strongly alkaline RTU may have a pH of about 11 or greater, and a moderately alkaline RTU may have a pH between about 7 and about 11. According to an aspect of the invention, the alkalinity source is provided in an amount sufficient to generate a strongly alkaline RTU.

Alkaline cleaner compositions are well known as those that contain inorganic sources, including alkali or alkaline earth metal borates, silicates, carbonates, hydroxides, phosphates and mixtures thereof. It is to be appreciated that phosphate includes all the broad class of phosphate materials, such as phosphates, pyrophosphates, polyphosphates (such as tripolyphosphate) and the like. Silicates include all of the usual silicates used in cleaning such as metasilicates, silicates and the like. The alkali or alkaline earth metals include such components as sodium, potassium, calcium, magnesium, barium and the like. It is to be appreciated that a cleaner composition can be improved by utilizing various mixtures of alkalinity sources.

In a preferred aspect, the alkalinity source is an inorganic alkali metal base. In a further preferred aspect, the alkalinity source is an alkali metal hydroxide. The sprayable cleaning composition may include, for example, sodium hydroxide. The inorganic alkali content of the spray-on cleaners of the invention is preferably derived from sodium or potassium hydroxide which can be used in both liquid (about 10-60 wt. % aqueous solution) or in solid (powder, flake or pellet) form. Preferably the preferred form of the alkali metal base is commercially available sodium hydroxide which can be obtained in aqueous solution at concentrations of about 50 wt. % and in a variety of solid forms of varying particle size and shapes.

Alkaline cleaner compositions are well known as those that contain organic sources, including nitrogen bases. Organic sources of alkalinity are often strong nitrogen bases including, for example, ammonia, monoethanol amine, monopropanol amine, diethanol amine, dipropanol amine, triethanol amine, tripropanol amine, etc. One value of using the monoalkanol amine compounds relates to the solvent nature of the liquid amines. The use of some substantial proportion of a monoethanol amine, monopropanol amine, etc. can provide substantial alkalinity but can also provide substantial solvent power in combination with the other materials in the invention. In a preferred aspect, the alkalinity source is an organic monoethanol amine.

In a further preferred aspect, the alkalinity source is a combination of inorganic and organic alkalinity. The sprayable cleaning composition may include, for example, a combination of inorganic alkali such as sodium hydroxide and organic nitrogen bases such as ethanolamines.

In one example, an effective amount of the alkalinity source is added to maintain an alkaline pH. Suitable concentrations of the alkalinity source, such as either a combination of alkalinity sources or a single alkalinity source, include between about 0.1% and about 25% by weight, between about 0.1% and about 20% by weight, between about 1% and about 20% by weight, and more preferably between about 1% and about 10% by weight of the cleaning composition. Without being limited according to the invention, all ranges recited are inclusive of the numbers defining the range and include each integer within the defined range.

Acidity Source

In an aspect, the sprayable cleaning composition includes an acidity or acid source. The source of acid can be an organic source or an inorganic source of acid. The source of acid can be a strong acid or a strong acid combined with a weak acid, or a combination of weak acids. For the purposes of this invention, a source of acid is a composition that can be added to an aqueous system and result in a pH less than about 7. In preferred aspects of the invention, an acidic pH of from about less than 7, from about 6, about 6 or less, about 5, about 5 or less, about 4, about 4 or less, about 3, about 3 or less, about 2, about 2 or less, about 1.5 or less, or about 1 or less. In a preferred aspect, the pH of an acidic composition according to the invention is between about 1 and about 4, or between about 1 and about 3, or preferably between about 1 and about 2.5.

Acidic cleaning compositions are well known as those that contain an acidulant sufficient provide an acidic pH in an aqueous use solution. The acid may be selected from the group consisting of mineral acids, organic acids, and a combination thereof. The mineral acids may be selected from the group consisting of hydrochloric acid, sulfuric acid, amido sulfuric acid (98%), nitric acid, phosphoric acid, hydrofluoric acid, sulfamic acid, and combinations thereof and said organic acids may be selected from the group consisting of citric acid and its salts, formic acid, acetic acid, peracids including peracetic acid, peroxyacetic acid and peroxyformic acid, glycolic acid (hydroxyacetic acid), oxalic acid, propionic acid, lactic acid (hydroxypropionic acid), butyric acid, and combinations thereof. These acids are commercial chemicals available from a chemical supply company. These acids can be purchased in dry or in liquid form or in formulations that contain other functional chemicals which also can be in dry or liquid form.

"Weak" organic and inorganic acids can be used in the invention as a component of the acid cleaner. Weak acids are acids in which the first dissociation step of a proton from the acid cation moiety does not proceed essentially to completion when the acid is dissolved in water at ambient temperatures at a concentration within the range useful to form the present cleaning composition. Such inorganic acids are also referred to as weak electrolytes as the term is used in the text book Quantitative Inorganic Analysis, I. M. Kolthoff et al., published by McMillan Co., Third Edition, 1952, pp. 34-37. Most common commercially available weak organic and inorganic acids can be used in the invention. Examples of weak organic and inorganic acids include phosphoric acid, sulfamic acid, acetic acid, hydroxy acetic acid, citric acid, benzoic acid, tartaric acid, maleic acid, malic acid, fumaric acid and the like.

In one example, an effective amount of the acidity source is added to maintain an acidic pH. Suitable concentrations of the acid source, such as either a combination of acid sources or a single acid source, include between about 0.1% and about 50% by weight, between about 1% and about 40% by weight, between about 5% and about 40% by weight, and more preferably between about 10% and about 40% by weight of the cleaning composition. Without being limited according to the invention, all ranges recited are inclusive of the numbers defining the range and include each integer within the defined range.

Oxidizing Source

Beneficially, the reduced-misting sprayable aqueous cleaning compositions according to the invention are suitable for both neutral, alkaline and acidic cleaning compositions, including oxidizing compositions. As a result, the inverse emulsion polymers disclosed herein provide a universal reduced-misting cleaning composition suitable for various applications of use requiring either alkaline or acidic cleaning compositions. Accordingly, the oxidizing source can be employed in combination with alkalinity source and/or acidic source to provide a desired pH for an oxidizing composition according to the invention. In an aspect, the oxidizing agent is formulated (including with optional alkalinity source and/or acidic source) to pH between about 5 and about 10, between about 6 and about 9, preferably between about 6.5 and about 8, and still more preferably at a pH of about 7 (or neutral). In an additional embodiment, the oxidizing source can be employed without additional alkalinity source and/or acidic source in the cleaning composition.

A suitable oxidizing agent is hydrogen peroxide. Hydrogen peroxide, $H_2O_2$, provides the advantages of having a high ratio of active oxygen because of its low molecular weight (34.014 g/mole) and is a weakly acidic, clear, and colorless liquid. Another advantage of hydrogen peroxide is that it decomposes into water and oxygen. It is advantageous to have these decomposition products because they are generally compatible with substances being treated. In an exemplary embodiment, the oxidizing agent can be provided in a formulated composition, such as DrySan Duo, where the oxidizing agent is hydrogen peroxide. Alternatively, the inverse emulsion (water-in-oil) polymer can be added to an oxidizing formulation, such as DrySan Duo, available from Ecolab Inc.

Additional suitable oxidizing agents, include inorganic oxidizing agents including the following types of compounds or sources of these compounds, or alkali metal salts including these types of compounds, or forming an adduct therewith:

hydrogen peroxide;

group 1 (IA) oxidizing agents, for example lithium peroxide, sodium peroxide, and the like;

group 2 (IIA) oxidizing agents, for example magnesium peroxide, calcium peroxide, strontium peroxide, barium peroxide, and the like;

group 12 (IIB) oxidizing agents, for example zinc peroxide, and the like;

group 13 (IIIA) oxidizing agents, for example boron compounds, such as perborates, for example sodium perborate hexahydrate of the formula $Na_2[Br_2(O_2)_2(OH)_4]_6H_2O$ (also called sodium perborate tetrahydrate); sodium peroxyborate tetrahydrate of the formula $Na_2Br_2(O_2)_2[(OH)_4]_4H_2O$ (also called sodium perborate trihydrate, and formerly written as $NaBO_33H_22O$); sodium peroxyborate of the formula $Na_2[B_2(O_2)_2(OH)_4]$ (also called sodium perborate monohydrate); and the like;

group 14 (IVA) oxidizing agents, for example persilicates and peroxycarbonates, which are also called percarbonates, such as persilicates or peroxycarbonates of alkali metals; and the like; in an embodiment, percarbonate; in an embodiment, persilicate;

group 15 (VA) oxidizing agents, for example peroxynitrous acid and its salts; peroxyphosphoric acids and their salts, for example, perphosphates; and the like; in an embodiment, perphosphate;

group 16 (VIA) oxidizing agents, for example peroxysulfuric acids and their salts, such as peroxymonosulfuric and peroxydisulfuric acids, and their salts, such as persulfates, for example, sodium persulfate; and the like; in an embodiment, persulfate;

group VIIa oxidizing agents such as sodium periodate, potassium perchlorate and the like.

Other active inorganic oxygen compounds can include transition metal peroxides; and other such peroxygen compounds, and mixtures thereof.

Hydrogen peroxide presents one suitable example of an inorganic oxidizing agent. Hydrogen peroxide can be provided as a mixture of hydrogen peroxide and water, e.g., as liquid hydrogen peroxide in an aqueous solution. Hydrogen peroxide is commercially available at concentrations of 35%, 70%, and 90% in water. For safety, the 35% is commonly used. The present compositions can include, for example, about 2 to about 30 wt-% or about 5 to about 20 wt-% hydrogen peroxide.

In an embodiment, the inorganic oxidizing agent includes hydrogen peroxide adduct. For example, the inorganic oxidizing agent can include hydrogen peroxide, hydrogen peroxide adduct, or mixtures thereof. Any of a variety of hydrogen peroxide adducts are suitable for use in the present compositions and methods. For example, suitable hydrogen peroxide adducts include percarbonate salt, urea peroxide, peracetyl borate, an adduct of $H_2O_2$ and polyvinyl pyrrolidone, sodium percarbonate, potassium percarbonate, mixtures thereof, or the like. Suitable hydrogen peroxide adducts include percarbonate salt, urea peroxide, peracetyl borate, an adduct of $H_2O_2$ and polyvinyl pyrrolidone, or mixtures thereof. Suitable hydrogen peroxide adducts include sodium percarbonate, potassium percarbonate, or mixtures thereof, for example sodium percarbonate.

Peroxycarboxylic acids can further be used as an oxidizing agent for the cleaning compositions. As used herein, the term "peracid" may also be referred to as a "percarboxylic acid," "peroxycarboxylic acid" or "peroxyacid." Sulfoperoxycarboxylic acids, sulfonated peracids and sulfonated peroxycarboxylic acids are also included within the terms "peroxycarboxylic acid" and "peracid" as used herein. The terms "sulfoperoxycarboxylic acid," "sulfonated peracid," or "sulfonated peroxycarboxylic acid" refers to the peroxycarboxylic acid form of a sulfonated carboxylic acid as disclosed in U.S. Pat. No. 8,344,026, and U.S. Patent Publication Nos. 2010/0048730 and 2012/0052134, each of which are incorporated herein by reference in their entirety. As one of skill in the art appreciates, a peracid refers to an acid having the hydrogen of the hydroxyl group in carboxylic acid replaced by a hydroxy group. Oxidizing peracids may also be referred to herein as peroxycarboxylic acids. A peracid includes any compound of the formula R—$(COOOH)_n$ in which R can be hydrogen, alkyl, alkenyl, alkyne, acylic, alicyclic group, aryl, heteroaryl, or heterocyclic group, and n is 1, 2, or 3, and named by prefixing the parent acid with peroxy. Preferably R includes hydrogen, alkyl, or alkenyl. The terms "alkyl," "alkenyl," "alkyne," "acylic," "alicyclic group," "aryl," "heteroaryl," and "heterocyclic group" are as defined herein.

In an embodiment, the cleaning compositions can include hydrogen peroxide as oxidizing agent. In a further embodiment, the cleaning compositions can include a peroxycarboxylic acid.

In a preferred embodiment, the cleaning compositiosn can include an oxidizing source that is hydrogen peroxide for a neutral composition. In a preferred embodiment, the cleaning compositiosn can include an oxidizing source that is chlorine for an alkaline composition.

Surfactants

The reduced-misting sprayable aqueous cleaning compositions according to the invention includes a surfactant or surfactant system. A variety of surfactants may be used, including anionic, nonionic, cationic, and amphoteric surfactants. In an aspect, the reduced-misting sprayable aqueous cleaning compositions employ a nonionic surfactant, including an alcohol ethoxylate. In other aspects, the reduced-misting sprayable aqueous cleaning compositions employ a nonionic and/or cationic surfactant (dependent upon the pH of the composition), including an amine oxide. In other aspects, the reduced-misting sprayable aqueous cleaning compositions employ an amphoteric surfactant, including a cocobetaine such as cocoamidopropylbetaine. In other aspects, the reduced-misting sprayable aqueous cleaning compositions employ a combination of nonionic and amphoteric surfactants, including for example alcohol ethoxylates, including for example linear alcohol ethoxylates, including for example C9-C15, C9-C11, C12-C13 and/or C12-C15 linear alcohol ethoxylates, amine oxides and/or cocobetaines.

Suitable anionic surfactants contain a large lipophilic moiety and a strong anionic group. Such anionic surfactants contain typically anionic groups selected from the group consisting of sulfonic, sulfuric or phosphoric, phosphonic or carboxylic acid groups which when neutralized will yield sulfonate, sulfate, phosphonate, or carboxylate with a cation thereof preferably being selected from the group consisting of an alkali metal, ammonium, alkanol amine such as sodium, ammonium or triethanol amine. Examples of operative anionic sulfonate or sulfate surfactants include alkylbenzene sulfonates, sodium xylene sulfonates, sodium dodecylbenzene sulfonates, sodium linear tridecylbenzene sulfonates, potassium octyldecylbenzene sulfonates, sodium lauryl sulfate, sodium palmityl sulfate, sodium cocoalkyl sulfate, sodium olefin sulfonate.

Suitable nonionic surfactants carry no discrete charge when dissolved in aqueous media. Hydrophilicity of the nonionic is provided by hydrogen bonding with water molecules. Such nonionic surfactants include alkoxylated surfactants, EO/PO copolymers, capped EO/PO copolymers, alcohol alkoxylates, capped alcohol alkoxylates, mixtures thereof, or the like. Further suitable nonionic surfactants include amine oxides, phosphine oxides, sulfoxides and their alkoxylated derivatives. Particularly suitable amine oxides include tertiary amine oxide surfactants which typically comprise three alkyl groups attached to an amine oxide (N→O). Commonly the alkyl groups comprise two lower (C1-4) alkyl groups combined with one higher C 6-24 alkyl groups, or can comprise two higher alkyl groups combined with one lower alkyl group. Further, the lower alkyl groups can comprise alkyl groups substituted with hydrophilic moiety such as hydroxyl, amine groups, carboxylic groups, etc.

Amine oxides (tertiary amine oxides) have the corresponding general formula:

$$R^1—(OR^4)_n—\underset{R^3}{\overset{R^2}{N}}\rightarrow O$$

wherein the arrow is a conventional representation of a semi-polar bond; and, $R^1$, $R^2$, and $R^3$ may be aliphatic, aromatic, heterocyclic, alicyclic, or combinations thereof. Generally, for amine oxides of detergent interest, $R^1$ is an alkyl radical of from about 8 to about 24 carbon atoms; $R^2$ and $R^3$ are alkyl or hydroxyalkyl of 1-3 carbon atoms or a mixture thereof; $R^2$ and $R^3$ can be attached to each other, e.g. through an oxygen or nitrogen atom, to form a ring structure; $R^4$ is an alkylene or a hydroxyalkylene group containing 2 to 3 carbon atoms; and n ranges from 0 to about 20. An amine oxide can be generated from the corresponding amine and an oxidizing agent, such as hydrogen peroxide. The classification of amine oxide materials may depend on the pH of the solution. On the acid side, amine oxide materials protonate and can simulate cationic surfactant characteristics. At neutral pH, amine oxide materials are non-ionic surfactants and on the alkaline side, they exhibit anionic characteristics.

Useful water soluble amine oxide surfactants are selected from the octyl, decyl, dodecyl (lauryl), isododecyl, coconut, or tallow alkyl di-(lower alkyl) amine oxides, specific examples of which are octyldimethylamine oxide, nonyldimethylamine oxide, decyldimethylamine oxide, undecyldimethylamine oxide, dodecyldimethylamine oxide, isododecyldimethyl amine oxide, tridecyldimethylamine oxide, tetradecyldimethylamine oxide, pentadecyldimethylamine oxide, hexadecyldimethylamine oxide, heptadecyldimethylamine oxide, octadecyldimethylaine oxide, dodecyldipropylamine oxide, tetradecyldipropylamine oxide, hexadecyldipropylamine oxide, tetradecyldibutylamine oxide, octadecyldibutylamine oxide, bis(2-hydroxyethyl)dodecylamine oxide, bis(2-hydroxyethyl)-3-dodecoxy-1-hydroxypropylamine oxide, dimethyl-(2-hydroxydodecyl) amine oxide, 3,6,9-trioctadecyldimethylamine oxide and 3-dodecoxy-2-hydroxypropyldi-(2-hydroxyethyl)amine oxide.

Suitable lipophilic moieties and cationic surfactants include amino or quaternary nitrogen groups where the hydrophilic moiety of the nitrogen bears a positive charge when dissolved in aqueous media. The cleaning composition can contain a cationic surfactant component that includes a detersive amount of cationic surfactant or a mixture of cationic surfactants. The cationic surfactant can be used to provide sanitizing properties. Cationic surfactants that can be used in the cleaning composition include, but are not limited to: amines such as primary, secondary and tertiary monoamines with C18 alkyl or alkenyl chains, ethoxylated alkylamines, alkoxylates of ethylenediamine, imidazoles such as a 1-(2-hydroxyethyl)-2-imidazoline, a 2 alkyl-1-(2-hydroxyethyl)-2-imidazoline, and the like; and quaternary ammonium compounds and salts, as for example, alkylquaternary ammonium chloride surfactants such as n alkyl(C12-C18)dimethylbenzyl ammonium chloride, n tetradecyldimethylbenzylammonium chloride monohydrate, a naphthylene-substituted quaternary ammonium chloride such as dimethyl-1-naphthylmethylammonium chloride.

Suitable amphoteric surfactants contain both an acidic and a basic hydrophilic moiety in the structure and may be any of the anionic or cationic groups that have just been described previously in the sections relating to anionic or cationic surfactants. Anionic groups include carboxylate, sulfate, sulfonate, phosphonate, etc. while the cationic groups typically comprise compounds having amine nitrogens. Many amphoteric surfactants also contain ether oxides or hydroxyl groups that strengthen their hydrophilic tendency. Preferred amphoteric surfactants of this invention comprise surfactants that have a cationic amino group combined with an anionic carboxylate or sulfonate group. Examples of useful amphoteric surfactants include the sulfobetaines, N-coco-3,3-aminopropionic acid and its sodium salt, n-tallow-3-amino-dipropionate disodium salt, 1,1-bis (carboxymethyl)-2-undecyl-2-imidazolinium hydroxide disodium salt, cocoaminobutyric acid, cocoaminopropionic acid, cocoamidocarboxy glycinate, cocobetaine. Suitable amphoteric surfactants include cocoamidopropylbetaine and cocoaminoethylbetaine.

Suitable concentrations of the surfactant (surfactant system) for combination with the inverse emulsion polymers include between about 0.1% and about 25% by weight, between about 0.5% and about 20% by weight, between about 0.5% and about 15% by weight, and more preferably between about 1% and about 10% by weight of the cleaning composition. Without being limited according to the invention, all ranges recited are inclusive of the numbers defining the range and include each integer within the defined range.

Water

In an aspect, the sprayable cleaning composition further includes water. Suitable concentrations of water include between about 25% and about 99% by weight of the cleaning composition. More preferable concentrations of water include between about 50% and about 90% by weight of the cleaning composition. In alkaline cleaning compositions suitable concentrations of water include between about 25% and about 99% by weight of the cleaning composition, or between about 50% and about 90% by weight of the cleaning composition, or preferably between about 70% and about 90% by weight of the cleaning composition. In acidic cleaning compositions suitable concentrations of water include between about 25% and about 99% by weight of the cleaning composition, or between about 40% and about 70% by weight of the cleaning composition, or preferably between about 40% and about 60% by weight of the cleaning composition. It is understood that water may be added to the cleaning composition as a discrete component and may be added as water of hydration.

Additional Functional Ingredients

The components of the compositions can further be combined with various functional components. In some embodiments, the compositions including the inverse emulsion polymer, surfactants, acidity or alkalinity agents, solvent and water make up a large amount, or even substantially all of the total weight of the composition. For example, in some embodiments few or no additional functional ingredients are disposed therein.

In other embodiments, additional functional ingredients may be included in the compositions. The functional ingredients provide desired properties and functionalities to the compositions. For the purpose of this application, the term "functional ingredient" includes a material that when dispersed or dissolved in the aqueous use solution provides a beneficial property in a particular use. Some particular examples of functional materials are discussed in more detail below, although the particular materials discussed are given by way of example only, and that a broad variety of other functional ingredients may be used. For example, many of the functional materials discussed below relate to materials used in hard surface cleaning. However, other embodiments may include functional ingredients for use in other applications.

In some embodiments, the compositions may include additional functional ingredients including, for example, thickeners and/or viscosity modifiers, solvents, solubility modifiers, metal protecting agents, stabilizing agents, corrosion inhibitors, sequestrants and/or chelating agents, oxidizing agents, fragrances and/or dyes, hydrotropes or couplers, buffers, adjuvant materials for hard surface cleaning and the like.

Exemplary adjuvant materials for hard surface cleaning may include foam enhancing agents, foam suppressing agents (when desired), preservatives, antioxidants, pH adjusting agents, perfumes, colorants, cosolvents and other useful well understood material adjuvants.

Aqueous Solvents

The cleaning compositions can optionally contain a compatible solvent. Suitable solvents are soluble in the aqueous cleaning composition of the invention at use proportions.

The cleaner materials of the invention also typically include a volatile organic compound (VOC) such as but not limited to solvents. A compound is non-volatile if its vapor pressure is below 0.1 mm Hg at 20° C. VOCs have been the subject of regulation by different government entities, the most prominent regulations having been established by the California Air Resource Board in its General Consumer Products Regulation. Thus, it may be desirable to formulate the cleaner of the invention containing low or no VOCs.

Preferred soluble solvents include lower alkanols, lower alkyl ethers, and lower alkyl glycol ethers. These materials are colorless liquids with mild pleasant odors, are excellent solvents and coupling agents and are typically miscible with aqueous cleaning compositions of the invention. Examples of such useful solvents include methanol, ethanol, propanol, isopropanol and butanol, isobutanol, benzyl alcohol, ethylene glycol, diethylene glycol, triethylene glycol, propylene glycol, dipropylene glycol, mixed ethylene-propylene glycol ethers. The glycol ethers include lower alkyl (C1-8 alkyl) ethers including propylene glycolmethyl ether, propylene glycol ethyl ether, propylene glycol phenyl ether, propylene glycol propyl ether, dipropylene glycol methyl ether, dipropylene glycol phenyl ether, dipropylene glycol ethyl ether, tripropylene glycol methyl ether, ethylene glycol methyl ether, ethylene glycol ethyl ether, ethylene glycol butyl ether, diethylene glycol methyl ether diethylene glycol phenyl ether, diethylene glycol butyl ether, ethylene glycol dimethyl ether, ethylene glycol monobutyl ether, ethylene glycol phenyl ether and others. The solvent capacity of the cleaners can be augmented by using monoalkanol amines. The solvent, when present is typically present in an amount of from about 0 wt-% to about 20 wt-%. In a preferred embodiment the solvent in not present in a ready to use solution in an amount of no more than 10 wt-%.

Thickeners or Viscosity Modifiers

In some aspects, the inverse emulsion polymers of the compositions of the present invention prevent the usage of xanthan gum and other additional polymers as thickening or viscosity agents. Accordingly, in some aspects the compositions do not include the use of thickening agents and/or are substantially free of thickening agents. In alternative aspects, the use of the inverse emulsion polymer for modifying the viscosity of the composition may be used in combination with small amounts of xanthan gum and/or other additional polymers as thickening or viscosity agents. In an embodiment of the invention, the compositions employing the inverse emulsion polymer may further include from 0 wt-% to about 1 wt-% xanthan gum for increase in viscosity of the compositions, from 0.001 wt-% to about 1 wt-% xanthan gum for increase in viscosity of the compositions, or from 0.005 wt-% to about 0.5 wt-% xanthan gum for increase in viscosity of the compositions.

A variety of well-known organic thickener materials are known in the art. In alternative embodiments according to the invention wherein a small concentration of a thickener is employed in combination with the inverse emulsion polymer, natural polymers or gums derived from plant or animal sources are preferred. Such materials are often large polysaccharide molecules having substantial thickening capacity.

A substantially soluble organic thickener can be used to provide thixotropic to the compositions of the invention. The preferred thickeners have some substantial proportion of water solubility to promote easy removability. Examples of soluble organic thickeners include for example, carboxylated vinyl polymers such as polyacrylic acids and sodium salts thereof, boric acid, diethanolamide, coco-diethanolamide, coco-monoethanolamide, stearic-diethanolamide, ethoxylated cellulose, hydroxyethyl styrylamide, oleic-diethanolamide, stearic-monoethanolamide, cetyl alcohol, steroyl alcohol, polyacrylamide thickeners, ethanol glycol disterate, xanthan compositions, sodium alginate and algin products, hydroxypropyl cellulose, hydroxyethyl cellulose, and other similar aqueous thickeners that have some substantial proportion of water solubility.

Exemplary thickeners include xanthan gum derivatives. Xanthan is an extracellular polysaccharide of *xanthomonas campestras*. Xanthan is made by fermentation based on corn sugar or other corn sweetener by-products. Xanthan comprises a poly beta-(1→4)-D-Glucopyranosyl backbone chain, similar to that found in cellulose. Aqueous dispersions of xanthan gum and its derivatives exhibit novel and remarkable rheological properties. Low concentrations of the gum have relatively high viscosity which permits it economical use and application. Xanthan gum solutions exhibit high pseudoplasticity, i.e. over a wide range of concentrations, rapid shear thinning occurs that is generally understood to be instantaneously reversible. Non-sheared materials have viscosity that appears to be independent of the pH and independent of temperature over wide ranges. Preferred xanthan materials include crosslinked xanthan materials. Xanthan polymers can be crosslinked with a variety of known covalent reacting crosslinking agents reactive with the hydroxyl functionality of large polysaccharide molecules and can also be crosslinked using divalent, trivalent or polyvalent metal ions. Such crosslinked xanthan gels are disclosed in U.S. Pat. No. 4,782,901, which is incorporated by reference herein. Suitable crosslinking agents for xanthan materials include metal cations such as $Al^{+3}$, $Fe^{+3}$, $Sb^{+3}$, $Zr^{+4}$ and other transition metals, etc. Known organic crosslinking agents can also be used.

Viscoelastic Surfactants

In some aspects, the inverse emulsion polymers of the compositions of the present invention prevent the usage of additional polymers as thickening or viscosity agents. Accordingly, in some aspects the compositions do not include the use of additional viscoelastic surfactants and/or are substantially free of such thickening agents.

In alternative aspects, the use of the inverse emulsion polymer for modifying the viscosity of the composition may be used in combination with small amounts of viscoelastic surfactants, such as for example those disclosed in U.S. Patent Publication No. 2014/0148371 and U.S. Pat. No. 9,029,313, each of which are herein incorporated by reference in their entirety. In an exemplary embodiment where vertical cling is preferred an additional thickening or viscosity agent may be employed. In an embodiment of the invention, the compositions employing the inverse emulsion polymer may further include from 0 wt-% to about 1 wt-% viscoelastic surfactants for increase in viscosity of the compositions, from 0.001 wt-% to about 1 wt-% viscoelastic surfactants for increase in viscosity of the compositions, or from 0.005 wt-% to about 0.5 wt-% viscoelastic surfactants for increase in viscosity of the compositions.

Sequestrants

The cleaning composition can contain an organic or inorganic sequestrant or mixtures of sequestrants. Organic sequestrants such as sodium citrate, the alkali metal salts of nitrilotriacetic acid (NTA), dicarboxymethyl glutamic acid tetrasodium salt (GLDA), EDTA, alkali metal gluconates, polyelectrolytes such as a polyacrylic acid, and the like can be used herein. The most preferred sequestrants are organic sequestrants such as sodium gluconate due to the compatibility of the sequestrant with the formulation base.

The present invention can also incorporate sequestrants to include materials such as, complex phosphate sequestrants, including sodium tripolyphosphate, sodium hexametaphosphate, and the like, as well as mixtures thereof. Phosphates, the sodium condensed phosphate hardness sequestering agent component functions as a water softener, a cleaner, and a detergent builder. Alkali metal (M) linear and cyclic condensed phosphates commonly have a $M_2O:P_2O_5$ mole ratio of about 1:1 to 2:1 and greater. Typical polyphosphates of this kind are the preferred sodium tripolyphosphate, sodium hexametaphosphate, sodium metaphosphate as well as corresponding potassium salts of these phosphates and mixtures thereof. The particle size of the phosphate is not critical, and any finely divided or granular commercially available product can be employed.

Metal Protectors

The compositions of the invention can contain a material that can protect metal from corrosion. Such metal protectors include for example sodium gluconate and sodium glucoheptonate. If present, the metal protector is present in the composition in an amount of from about 0.1 wt-% to about 10 wt-%.

Dyes/Odorants

Various dyes, odorants including perfumes, and other aesthetic enhancing agents may also be included in the compositions. Examples of suitable commercially available dyes include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keystone Aniline and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Examples of suitable fragrances or perfumes include, but are not limited to: terpenoids such as citronellol, aldehydes such as amyl cinnamaldehyde, a jasmine such as C1S-jasmine or jasmal, and vanillin.

Manufacturing Methods

The cleaning compositions according to the invention can be made by combining the components in an aqueous diluent using commonly available containers and blending apparatus. Beneficially, no special manufacturing equipment is required for making the cleaning compositions employing the inverse emulsion polymers. A preferred method for manufacturing the cleaning composition of the invention includes introducing the components into a stirred production vessel. In an aspect, a quantity of the inverse emulsion polymer, surfactants, water, and then acid or alkaline components are combined. In an aspect, deionized water is employed.

Beneficially, the use of the emulsion polymers having high molecular weight to generate the cleaning composition solutions does not require long, energy intensive dissolution (or inversion of the polymers into solution) as a result of not significantly increasing the viscosity of the cleaning composition or exceeding solubility limits of the composition. In an aspect, the high molecular weight inverse emulsion polymers are readily blended into the cleaning compositions, resulting in clear, low viscosity solutions. In an aspect, the dissolution time is less than 10 minutes, or less than 5 minutes for a homogenous solution, and preferably less than 3 minutes for a homogenous solution as opposed to 30 minutes to a few hours for traditional thickeners such as xantham.

As a result of the rapid dissolution or inversion of the polymers into solution, the highly concentrated cleaning compositions can be manufactured in large batch volumes within less than about an hour, in comparison to conventional reduced-misting compositions require from about 8 to 24 hours or greater. Moreover, the cleaning compositions can be produced using in-line mixing or on-site formulation, providing a significant manufacturing benefit not obtained by the conventional reduced-misting compositions. Such manufacturing benefits are particular important as various sprayable hard surface compositions in need of reduced missing formulations and having short term stability would benefit from the enhanced ease in manufacturing afforded by the methods of making the cleaning compositions of the present invention.

Methods of Use

The sprayable cleaning compositions can be used for removing stubborn soils from a variety of surfaces. For example, the sprayable composition can be used in institutional applications, food and beverage applications, heath care applications, vehicle care applications, pest elimination applications, and laundering applications Such applications include but are not limited to kitchen and bathroom cleaning and destaining, general purpose cleaning and destaining, surface cleaning and destaining (particularly hard surfaces), industrial or household cleaners, and antimicrobial cleaning applications. Additional applications may include, for example, laundry and textile cleaning and destaining, carpet cleaning and destaining, vehicle cleaning and destaining, cleaning in place operations, glass window cleaning, air freshening or fragrancing, industrial or household cleaners, and antimicrobial cleaning. Beneficially, the inverse emulsion polymer-containing cleaning compositions provide a rapid diffusion rate of active cleaning agents to soils as a result of the thin liquid like viscosity of the cleaning compositions according to the invention.

The sprayable cleaning compositions can be used in any environment where it is desirable to reduce the amount of airborne particulates of the composition during spray applications. Without being limited according to the mechanism of the invention, in one embodiment, when the sprayable ready-to-use solution is dispensed, the solution exhibits an increased median droplet size and reduced mist or aerosol. In one embodiment, the sprayable use solution produces little or no small particle aerosol.

The sprayable cleaning compositions of the invention can be used in a pump spray format using a pump spray head and a suitable container. The materials are typically applied to hard surfaces containing difficult inorganic, organic, or matrix-blended soils. Such soils include baked-on or carbonized food residues. Other surfaces can contain soils derived from substantially insoluble hardness components of service water. The enhanced cleaning compositions of the invention rapidly remove such soils because the cleaners have a unique combination of inverse emulsion polymers that can rapidly remove the soils but resist formation of an amount of mist or aerosol during application that can cause respiratory distress.

The current cleaning composition can be a ready-to-use cleaning composition which may be applied with a transient trigger sprayer. A ready-to-use composition does not require dilution prior to application to a surface. The surfactant system may function to reduce atomization and misting of the current cleaning composition when dispensed using a sprayer. Example transient trigger sprayers include stock transient trigger sprayers (i.e., non-low velocity trigger sprayer) available from Calmar. Suitable commercially available stock transient trigger sprayers include Calmar Mixor HP 1.66 output trigger sprayer. The high molecular weight inverse emulsion polymers of the cleaning composition results in an increased median particle size of the dispensed cleaning composition, which reduces inhalation of the use solution.

The cleaning compositions may also be dispensed using a low velocity trigger sprayer, such as those available from Calmar. A typical transient trigger sprayer includes a discharge valve at the nozzle end of the discharge end of a discharge passage. A resilient member, such as a spring, keeps the discharge valve seated in a closed position. When the fluid pressure in the discharge valve is greater than the force of the resilient member, the discharge valve opens and disperses the fluid. A typical discharge valve on a stock trigger sprayer is a throttling valve which allows the user to control the actuation rate of the trigger sprayer. The actuation rate of the discharge valve determines the flow velocity, and a greater velocity results in smaller droplets. A low velocity trigger sprayer can contain a two-stage pressure build-up discharge valve assembly which regulates the operator's pumping stroke velocity and produces a well-defined particle size. In one example, the two-stage pressure build-up discharge valve can include a first valve having a high pressure threshold and a second valve having a lower pressure threshold so that the discharge valve snaps open and closed at the beginning and end of the pumping process. Example low-velocity trigger sprayers are commercially available from Calmar and are described in U.S. Pat. Nos. 5,522,547 and 7,775,405, which are incorporated in their entirety herein. The low velocity trigger sprayers may result in less drifting, misting and atomization of the cleaning composition, and may reduce the amount of small droplets dispensed. The cleaning composition containing the surfactant system may work in synergy with the low velocity trigger sprayer to produce a greater increase in droplet size than expect based on the components alone.

When sprayed, the cleaning compositions employing the high molecular weight inverse emulsion polymers result in reduced misting and atomization. Reduction in drift, misting, and atomization can be determined from the droplet size of the applied solution, with an increased droplet size indicating reduced misting and atomization. Reduced inhalation can also be measured indirectly by reduced aerosol mass collection from high volume air sampling. The increased droplet size also reduces inhalation of the use solution. Preferably, the median droplet size is about 10 microns or greater, about 50 microns or greater, about 70 microns or greater, about 100 microns or greater, about 150 microns or greater and preferably about 200 microns or greater. There are several methods for determining droplet size including, but not limited to, adaptive high speed cameras, laser diffraction, and phase Doppler particle analysis. Commercially available laser diffraction apparatuses include Spraytec available from Malvern and Helos available from Sympatec.

When sprayed, the cleaning compositions employing the high molecular weight inverse emulsion polymers further result in providing a liquid solution having sufficiently large droplets on the target surface to beneficially cling to a vertical surface for a period of time. Cleaning compositions applied to vertical surfaces typically run down the surface because of gravity. The solutions of the cleaning compositions are beneficially able to cling to vertical surfaces for an increased period of time. That is, after an elapsed period of time, a greater amount of the current cleaning composition still remains on a vertical surface compared to compositions not including the surfactant system. This increased cling time leads to exposing the surface to the cleaning composition for a longer period of time and potentially better cleaning. The cleaning composition can be easily removed by wiping.

The cleaning compositions may also be dispensed using a pressurized aerosol or aerosol pump spray. In pressurized aerosol application, the compositions of the invention are combined with an aerosol propellant and packaged in a metal high pressure container. Typical propellants include lower alkanes such as propane, butane, nitrous oxide, carbon dioxide, and a variety of fluorocarbons. Pressurized aerosol containers typically include a spray head, valve and dip tube that reaches to the opposite end of the container to ensure that the entire contents of the container is dispensed through the action of the propellant. When the valve is opened (depressed), the propellant pressure forces liquid into the dip tube and through the aerosol spray head. At the spray head exit, a spray pattern is created by the geometry of the aerosol valve which directs the material onto the soiled surface. Aerosol containers, dip tubes, propellants and spray valves are a well understood commercial technology. Pump spray devices commonly comprise a container spray head valve pump and dip tube. Actuating the pump causes a piston to travel in a cylinder filled with compositions of the invention. The piston motion forces the composition through an aerosol valve causing the spray to adhere to a soiled surface. Once the piston reaches its full travel path, the piston is returned by a spring action to its original position causing the cylinder to fill with additional quantities of the spray material through a valve opening. As the piston is again pressed through the cylinder the valve closes preventing the exit of any of the solution from the cylinder. The pump spray can deliver substantial quantities of the material onto the soiled surface.

All publications and patent applications in this specification are indicative of the level of ordinary skill in the art to which this invention pertains. All publications and patent applications are herein incorporated by reference to the same extent as if each individual publication or patent application was specifically and individually indicated as incorporated by reference.

EXAMPLES

Embodiments of the present invention are further defined in the following non-limiting Examples. It should be understood that these Examples, while indicating certain embodiments of the invention, are given by way of illustration only. From the above discussion and these Examples, one skilled in the art can ascertain the essential characteristics of this invention, and without departing from the spirit and scope thereof, can make various changes and modifications of the embodiments of the invention to adapt it to various usages and conditions. Thus, various modifications of the embodiments of the invention, in addition to those shown and described herein, will be apparent to those skilled in the art from the foregoing description. Such modifications are also intended to fall within the scope of the appended claims.

Example 1

Spray Pattern.

A spray pattern test was designed to visually grade the suitability of the inverse emulsion polymers for formulation of reduced misting alkaline cleaning compositions for spray applications in comparison to controls (negative control without any rheology modifier; positive control with rheology modifier xanthan gum). The various formulations are shown below in Table 2 and were prepared using a 1" stir bar at 250 rpm to form homogenous solutions.

TABLE 2

| (Alkaline Formulations) | | | |
|---|---|---|---|
| | Control (Negative) | Control (Positive) | 1 |
| DI Water | 88.3 | 85.8 | 85.96 |
| Xanthan gum polysaccharide | | 0.2 (2000 ppm) | |
| Inverse emersion polymer | | | 0.04 (400 ppm) |
| Chelant/Sequestrant | 0.5 | | |
| Alkalinity source | 7 | 9 | 9 |
| Amphoteric surfactant | 2 | 2 | 2 |
| Nonionic surfactant | | 0.5 | 0.5 |
| Monoethanolamine (99%) | 1.25 | 0.9 | 0.9 |
| Sodium gluconate (granular) | | 1.6 | 1.6 |
| Additional functional ingredients | 0.941 | 0.0003 | 0.0003 |

Each sample was sprayed using the same spray head—transient trigger sprayer available from Calmar (Calmar Mixor HP 1.66 output trigger sprayer). All spays were made from a distance of 14" from the paper target. The spray was initiated at a parallel to horizontal orientation compared to bench surface, and 1 spray trigger pull was completed with an image capture for observation obtained 5 seconds following the spray. The observation of the spray application for each cleaning composition was observed as follows:

Control (negative) resulted in very fine spray and misting with very small droplets, wherein the droplet spray spread across the entire sheet. The very fine mist/spray had a wide spray pattern and there was noticeable respiratory irritation as a result of inhalation.

Control (positive) resulted in a uniform spray with large droplet size, wherein the majority of the spray was localized in the center. Small spray droplets were spread across the entire sheet. In comparison to the other formulations the Control (positive) was the most difficult to react the trigger (result of increased thickness/rheology modification).

Formulation 1 resulted in a heavy stream like spray pattern, localized in the center of the sheet. The formulation resulted in the lowest number of small spray droplets across the entire sheet. The formulation was observed to have a low viscosity in comparison to the Control (positive) with stringiness under low shear. The 400 ppm inverse emulsion polymer was 30% active, providing 120 ppm active polymer.

Comparison of Formulation 1 containing the inverse emulsion polymer for rheology modification resulted in a low stress ease of trigger use when spraying the cleaning composition in comparison to the Control (positive). This resulted in ease of spraying or application of use, providing a further benefit to the reduced misting achieved by both Formulation 1 and Control (positive). A further benefit observed was the fast dissolution rate of the emulsion polymer in comparison to the control rheology modifier. This resulted in a dissolution of less than 5 minutes for a homogenous solution of Formulation 1, compared to the very slow dissolution of 1-2 hours to obtain a homogenous solution of Control (positive).

Example 2

Spray Pattern and Measured Viscoelasticity.

The spray pattern test of Example 1 was employed to evaluate additional inverse emulsion polymers for formulation of reduced misting acidic cleaning compositions for spray applications in comparison to controls (negative control without any rheology modifier; positive control with rheology modifier xanthan gum). The various formulations were diluted from a concentrate to provide a diluted compositions (without fragrance or dye) are shown below in Table 3.

TABLE 3

| (Acidic Formulations) | | | | | |
|---|---|---|---|---|---|
| | Control (Negative) | Control (Positive) | 2 | 3 | 4 |
| DI Water | 54.2 | 54.2 | 54.2 | 54.2 | 54.2 |
| Xanthan gum polysaccharide | | 0.04 | | | |
| Inverse emersion polymer | | | 0.04 | 0.04 | 0.04 |
| Acidity source | 23.3 | 23.3 | 23.3 | 23.3 | 23.3 |
| Citric acid | 5.5 | 5.5 | 5.5 | 5.5 | 5.5 |
| Solvent | 8 | 8 | 8 | 8 | 8 |
| Nonionic surfactant | 7 | 7 | 7 | 7 | 7 |
| C9-C11 alcohol ethoxylate | 2 | 2 | 2 | 2 | 2 |

In all blended solutions the order of addition of inputs was emulsion polymer, surfactants, water, and then acid inputs. A significant advantage of using the emulsion polymers was demonstrated by the ease in introducing high molecular weight polymers to the solution without long, energy intensive dissolution, dramatic viscosity increases, or exceeding solubility limits. The dissolution of each of Formulations 2-4 containing the three evaluated high molecular weight emulsion polymers blended readily easily, resulting in clear, low viscosity solutions (with dissolution times of less than 5 minutes for a homogenous solution, compared to the very slow dissolution of 1-2 hours to obtain a homogenous solution of Control (positive), demonstrating very poor incorporation. The xanthan gum formed a gel in solution and after vigorous mixing continued to re-agglomerate and settle at the bottom of the container. This reduction in dissolution rate for the emulsion polymers was consistent with that observed with the alkaline formulations.

Spray Pattern

For the spray pattern of this Example the following modified conditions were employed relative to Example 1: diameter of target of 7.5", and spray distance 18-20".

Control (negative) resulted in very fine spray and misting with very small droplets, wherein the droplet spray spread across the entire sheet in a wide, uniform pattern. The aerosolized droplets were easily airborne and mist flashback was noticed at the point of use and beyond the application zone.

Control (positive) resulted in a narrow spray with large droplet size and little aerosolization. There was a high degree of difficulty to react or operate the trigger (result of increased thickness/rheology modification) and formulation appeared to gel inside the trigger.

Formulation 2 resulted in a narrow stream spray pattern, with large droplets. The spray once contacting the surface ran down the surface, illustrating no significant increase in viscosity (G', G") (specifically G' (elasticity) and G" (viscosity)) and the option for adding to the formulation according to the invention a viscoelastic surfactant and/or small concentration of xantum gum for compositions having no significant increase in viscosity (G', G"). The formulation provided a smooth trigger pull. The 400 ppm inverse emulsion polymer was 10% active, providing 40 ppm active polymer.

Formulation 3 resulted in a wide spray pattern, with uniform solution droplet pattern. The spray did not generate any flashback in the application zone and qualitatively provided the most preferred spray of the evaluated formulations. The formulation provided a smooth trigger pull, representing the smoothest trigger pull of the evaluations. The 400 ppm inverse emulsion polymer was 30% active, providing 120 ppm active polymer.

Formulation 4 resulted in a smaller spray pattern, with medium to large droplets. The formulation provided a smooth trigger pull. The 400 ppm inverse emulsion polymer was 50% active, providing 200 ppm active polymer.

Again, a comparison of Formulations 2-4 containing the inverse emulsion polymer for rheology modification resulted in a spray pattern having reduced misting and low stress/ease of trigger use when spraying the cleaning composition in comparison to the Control (positive). This resulted in ease of spraying or application of use, providing a further benefit to the reduced misting achieved by Formulations 2-4 and Control (positive). The formulations employing the inverse emulsion polymers did not result in flashback. Without being limited to a particular mechanism of action, the reduced misting achieved by the inverse emulsion polymer formulations is a result of the low level (ppm of polymer and ppm of active polymer) of the high molecular weight, flexible polymers, along with a high elongation viscosity provided by the polymers.

Viscoelasticity

Figure 2:
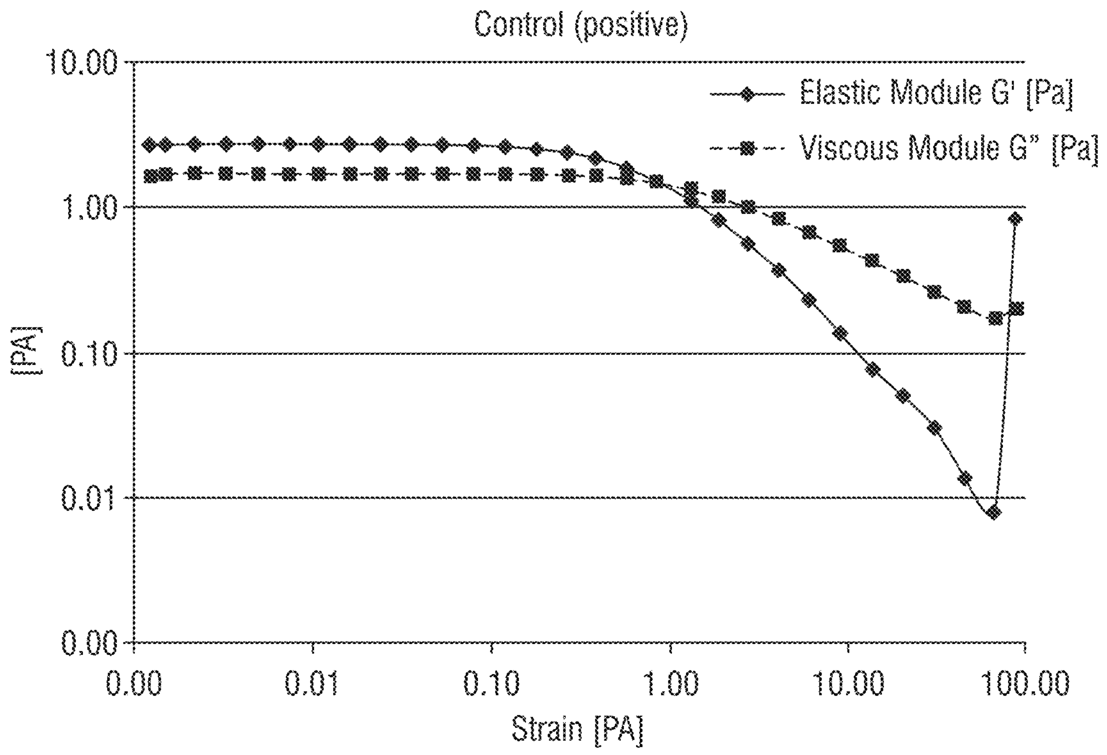
Figure 3:
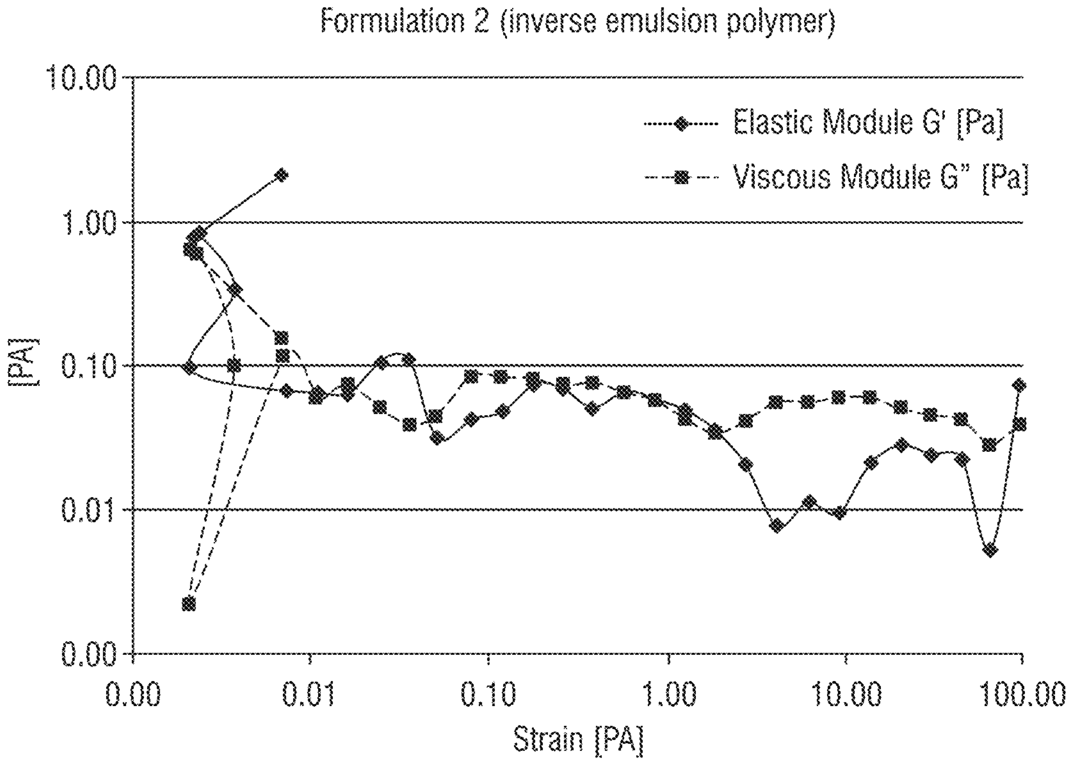
Figure 4:
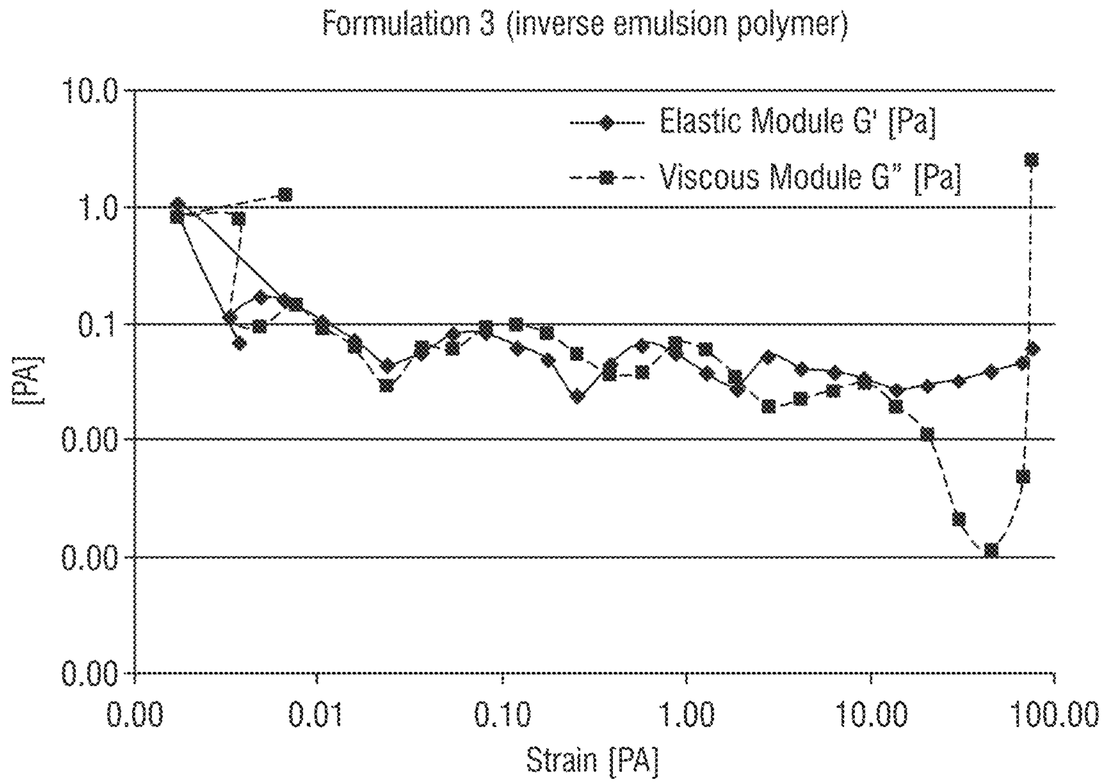
Figure 5:
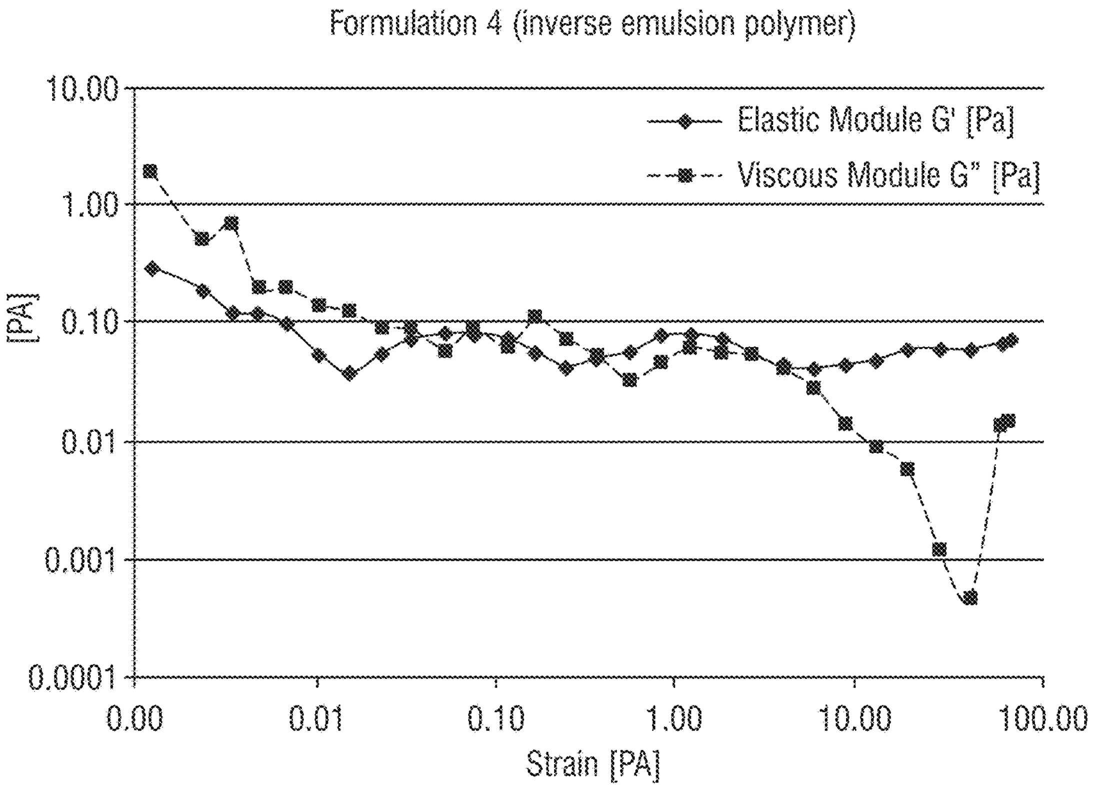

Bholin reheological (G', G") viscoelasticity measurements illustrating changes to elongational viscosity and impact on spray quality were obtained. FIG. 1 shows the measured viscoelasticity of Control (negative); FIG. 2 shows the measured viscoelasticity of Control (positive) depicting a swelling up of the xanthan gum formulations, consistent with the apparent gelling in the spray tests; FIG. 3 shows the measured viscoelasticity of Formulation 2 containing an inverse emulsion polymer where a low viscosity is measured for the reduced misting composition (behaving like water); FIG. 4 shows the measured viscoelasticity of Formulation 3 containing an inverse emulsion polymer; and FIG. 5 shows the measured viscoelasticity of Formulation 4 containing an inverse emulsion polymer.

The results of viscoelasticity measurement (G', G") demonstrate compositions according to embodiments of the invention comprising an inverse emulsion polymer in place of a viscosity modifier, even at low concentrations of active polymer, provide high molecular weight, flexible polymers which do not interrupt trigger spray for the compositions, compared to those formulations (controls) having higher level of a rigid rheology modifier (such as xanthan gum or other dispersion polymers). Beneficially, the low viscosity of the formulations containing an inverse emulsion polymer provide for ease in manufacturing due to the ease in dispersion of the polymers to form homogenous solutions. As a further benefit, the formulations containing an inverse emulsion polymer having fast inversion avoid the formation of fish-eyes, as is commonly referred to as the formation of a nondissolvable gel or clump.

Example 3

TSI OPS particle size test. Particle size analysis of various cleaning composition solutions containing inverse emulsion polymers were conducted. The micron size of particles to confirm reduced inhalation was conducted using TSI particle analysis. Various Control formula samples were evaluated with different inverse emulsion polymers according to the invention on the TSI OPS (optical particle sizer) particle size analyzer to determine mass and number counts of spray mist for each formula sample after being sprayed into a shower stall. A TSI OPS device with Aerosol Instrument Manager (AIM) Software was employed for the following test methodology.

The OPS is connected to a power source and computer. The cap of OPS is removed to allow air to pass through the inlet at a rate of 1 L/min and is positioned within the "breathing zone" of the shower stall. As referred to herein, the breathing zone refers to the area wherein mist comes back towards a user who sprays a cleaning formulation for a particular cleaning application, after making contact with a surface in need of cleaning. To simulate the breathing zone, a bucket was placed on a cart and positioned to elevate the OPS to an appropriate height to mimic the height of administration of an average adult administering a cleaning composition into a shower stall. The testing for this Example established the "breathing zone" for the exemplary test as approximately 55 inches in height and 37.5 inches from the shower wall to the location of OPS device. Additional dimensions of the shower stall included 54 inches from the floor to spray nozzle, 55 inches from the floor to air inlet, 80 inches from the floor to the top of curtains, and 58 inches wide (shower stall). The shower stall walls are thoroughly wet down with water. An initial measurement is obtained and recorded for the air before testing any samples.

A Calmar Mixor HP 1.66 sprayer was employed for each sample formulation, which was sprayed before each testing to ensure it was primed. The shower stall walls are again thoroughly wet down with water before application of the sample formulation. The OPS is powered to begin data collection while the sample formulation is sprayed into the shower stall. Each sample formulation is sprayed 40 times around the shower stall and the OPS collects the data for the sample formulation. During the testing drafts of air are avoided as they may disrupt sample collection by dispersing particles away from the test area. For each sample formulation 5 data collections are obtained and the highest particle count is used as the data point for the sample formulation.

After each tested sample formulation the shower stall is aired out, such as by using a fan or opening doors to the area to air out particles that were previously sprayed with the sample formulation. The remaining sample formulations are tested using the same procedure.

Various formulations were employed to evaluate the stability of various cleaning composition solutions containing inverse emulsion polymers in an alkaline composition to ensure the inverse emulsion polymers are not degraded during storage and/or shipment. Samples of each test formulation were generated as shown in Table 2 above and evaluated over 8 weeks at room temperature and 50 C.

Figure 6:
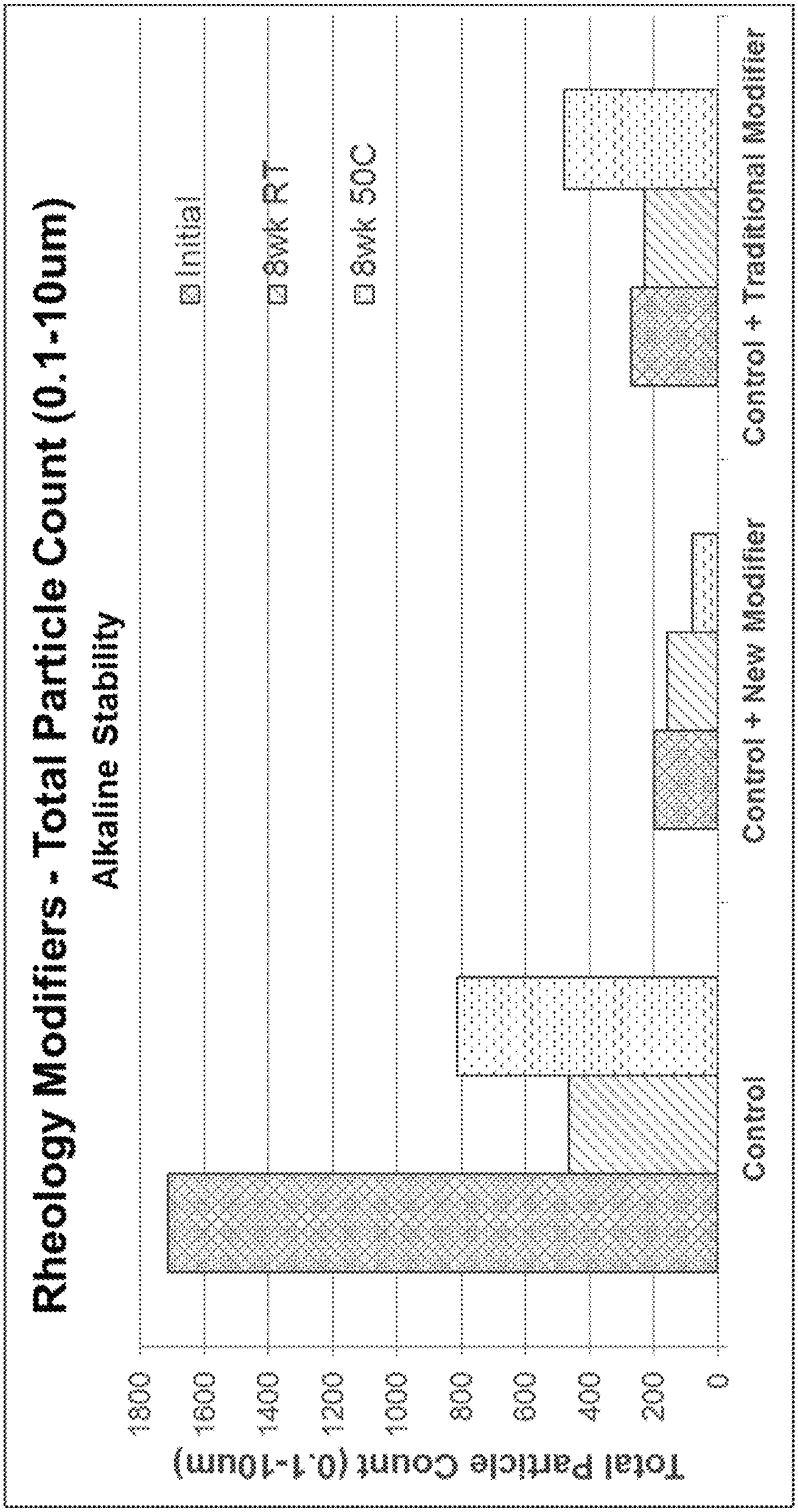
FIG. 6 shows the total number of particles having the size from 0.1-10 um (concentration of mist generated within the breathing zone) which shows a concentration of mist, according to embodiments of the invention containing the inverse emulsion polymer compared to Controls in alkaline solutions.

The results are shown in FIG. 6, providing a measurement of the total number of particles—0.1 to 10 micron misting particle analysis—within the breathing zone, providing a total concentration of mist of the undesireable micron size, generated according to the Example with the various tested formulations. The figures demonstrate the addition of inverse emulsion polymer reduces the number of small particle size particles compared to unmodified alkaline solution as well as xanthan gum modified solution, and also demonstrate inverse emulsion polymer solutions remain stable at lower particle size over 8 week storage stability test conditions.

Beneficially, the data demonstrates the inverse emulsion polymers are very effective rheology modifiers as they greatly reduce the misting or bounced back particles of the 0.1 to 10 micron range. As shown in FIG. 6, the unmodified xanthan gum used in the caustic based composition showed decomposition after 8 weeks at 50 C; however the formulation containing the inverse emulsion polymer exhibited superior stability.

Example 4

Additional formulations were employed to evaluate the stability of various cleaning composition solutions containing inverse emulsion polymers in an acidic composition to ensure the inverse emulsion polymers are not degraded during storage and/or shipment. Samples of each test formulation were generated as shown in Table 3 above and evaluated over 8 weeks at room temperature and 50 C. The same assessments and procedures were followed as set forth in Example 3.

Figure 7:
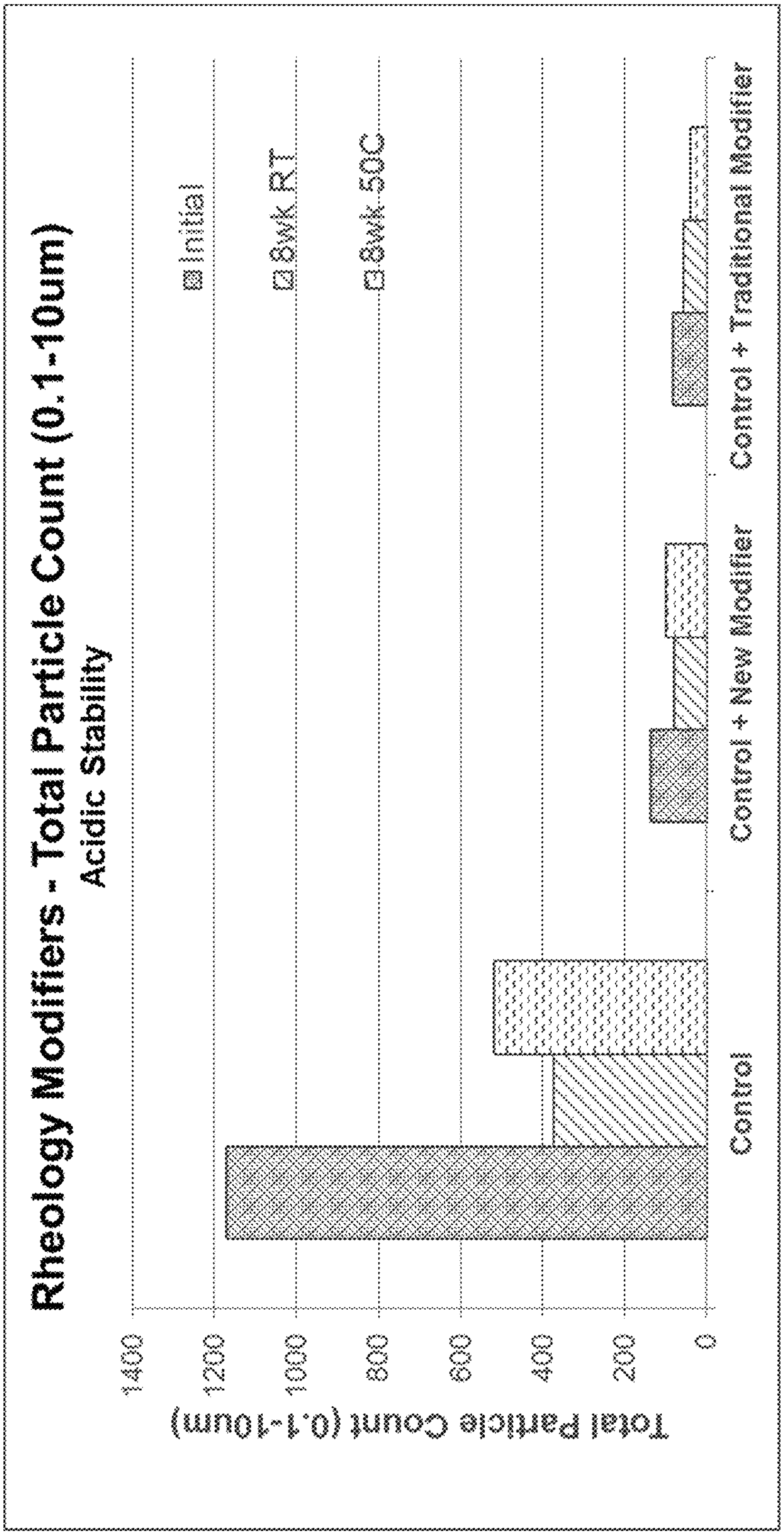
FIG. 7 shows the total number of particles having the size from 0.1-10 um (concentration of mist generated within the breathing zone) which shows a concentration of mist, according to embodiments of the invention containing the inverse emulsion polymer compared to Controls in acidic solutions.

The results are shown in FIG. 7, providing a measurement of the total number of particles—0.1 to 10 micron misting particle analysis—within the breathing zone, providing a total concentration of mist of the undesireable micron size, generated according to the Example with the various tested formulations. The figures demonstrate the addition of inverse emulsion polymer reduces the number of small particle size particles compared to unmodified alkaline solution as well as xanthan gum modified solution, and also demonstrate inverse emulsion polymer solutions remain stable at lower particle size over 8 week storage stability test conditions.

Beneficially, the data demonstrates the inverse emulsion polymers are very effective rheology modifiers as they greatly reduce the misting or bounced back particles of the 0.1 to 10 micron range. Also, the acidic composition with the unmodified xanthan gum, when sprayed, came out like a stream, which further confirms that even though the xanthan gum control minimized the total particle count of the small particles that would be in the breathing zone of a user (which were similarly reduced as were seen with the Formulations containing the inverse emulsion polymer), the straight ahead "stream like" target coverage will provide poor efficacy. By contrast, the formulation containing the inverse emulsion polymer provides desirable (straight ahead) spray target coverage, yet is equally effective in reducing the 0.1 to 10 micron range misting/bounced back particles.

Example 5

Rate of soil removal/cleaning efficacy was evalulated using a polymerized grease soil test, in particular a corn oil removal test method. This testing was performed to demonstrate the increased speed of action on soils achieved by the compositions containing a polyacrylic polyacramide copolymer as the inverse emulsion polymers compared to the conventional thickener xanthan gum in degreaser formulations. Beneficially, as shown according to embodiments of the invention, the high molecular weight inverse emulsion polymers decrease the viscoelasticity of the cleaning compositiosn in comparison to conventional thickeners and therefore see an improvement in the speed of cleaning. The speed of cleaning is a demonstration of the cleaning compositions ability to penetrate the polymerized soil so via relative soil removal over a set time.

Procedure

Panel Preparation

1. Prepared 304 stainless steel 3"×5" panels for testing using the following procedure.
2. Coat with Corn oil (0.12 g) with clean polyurethane foam sponge.
3. Preheated oven to 362° F. for at least 30 minutes.
4. Placed soiled panels on an aluminum pan on the center rack of the pre-heated oven as level as possible for 25 mins while rotating panels once at 10 minutes, 15 minutes, 20 minutes and taken out after 25 minutes.
5. Pull out the polymerized soil plates and allow cool to room temperature.

Test Procedure for Table 4

TABLE 4

| Sample | No Crack | Cracks over less than half area | Crackers cover the whole area |
|---|---|---|---|
| 0.2% xanthan | 1 | 2 | 4 |
| 0.04% Cleaning Composition (116 ppm active) | 0 | 1 | 6 |

1. Placed panel on flat surface. The "degree of polymerization" was increased by additional heating or curing of the plates at 200° C. for 20 minutes.
2. Used dropper to add 7 drops of each solution on to panel.
3. Stop watch started.
4. Solutions allowed to remain on surface for 25 seconds contact time.
5. Stop watch is stopped and solutions are rinsed off the surface of the panel using a pipette.

Test Procedure for Table 5 to confirm sample solution of cleaning composition was removed under same conditions.

TABLE 5

| Sample | No Crack | Cracks over less than half area | Crackers cover the whole area |
|---|---|---|---|
| 0.2% xanthan | 5 | 4 | 5 |
| 0.04% Cleaning Composition (116 ppm active) | 3 | 3 | 8 |

1. Placed panel on flat surface. The "degree of polymerization" was increased by additional heating or curing of the plates at 210° C. for 15 minutes.
2. Used dropper to add 14 drops of each solution on to panel.
3. Stop watch started.
4. Solutions allowed to remain on surface for 80 seconds contact time.
5. Stop watch is stopped and solutions are rinsed off the surface of the panel using a pipette.

Conclusion

The modified Degreaser RTU formulas with the inverse emulsion polymer instead of Xanthan gum are able to penetrate and remove the soil more effectively after a set amount of time. This is shown in the tables by the total number of panels that exhibit cracks (i.e. alkaline composition breaking the polymerized grease) covering the entire area in comparison to the xanthan samples. It is believed that the increased viscosity from the xanthan gum may inhibit the kinetics of the soil penetration. The Degreaser formulas were otherwise identical with the difference in 0.04% inverse emulsion polymer (116 ppm active) versus the 0.2% xanthan gum (2000 ppm active). The data correlates with speed of diffusion showing the cleaning activities can travel faster in the formula with the inverse emulsion polymer due to the lower shear viscosity. Beneficially this is achieved at a significantly decreased actives level of the polymer.

Example 6

Rate of soil removal/cleaning efficacy was evalulated for the acidic compositions to provide analogous confirmation of the rate in cleaning according to the invention as set forth in Example 5 for alkaline compositions. A soap scum removal test (using a synthetic shower soil) was conducted to evaluate the rate of cleaning achieved by acidic compositions according to embodiments of the invention containing the inverse emulsion polymers. Beneficially, as shown in the Example, the inverse emulsion polymers do not negatively interfere with the soil removal and ability to penetrate the soils to provide cleaning.

Procedure

Soiling of Slides:

1. Number each slide
2. Place a slide, number side down, on a standard top loading balance and spread 0.50 g (±0.01 g) of soil over the surface of the slide. Leave between ⅛ and ¼ of an inch of space between the soil and the edge of the slide
3. Repeat for each slide and allow them to dry completely (at least four hours)
4. After drying, the slides are to be baked at 200° C. in an oven with the soiled slides placed onto an oven tray and baked for 30 minutes, removed and allow to cool
5. Weigh each slide on an analytical balance and record the weight of slide and soil.

Cleaning Test:

1. Cut the O-Cel-O sponges in half such that they are 3"×3.6" and then rinse them thoroughly (preferably in a washing machine) to remove all anti-microbial additives.
2. Equip the Gardner with a two pound pad carriage
3. Place the microscope slide template into a Gardner tray and place the tray onto the machine.
4. Prepare approximately 300 g of use solution of each product.
5. Soak a sponge in the first product and wring it out thoroughly by hand or using the "sponge press" device. Evenly apply 15 g of product over one side of the sponge.
6. Place the sponge in the carriage with the "product-applied" side down
7. Place one or two slides into the slide template
8. Spray 5 sprays of product onto each test slide and allow the product to dwell for 30 seconds
9. Run the Gardner for 15 cycles
10. Remove the slides and rinse them thoroughly under running DI water
11. Allow the slides to dry for at least 4 hours and measure the final weight.

Reporting Test Results: Report the average weight loss and standard deviation of the replicates of each different condition tested.

Figure 8:
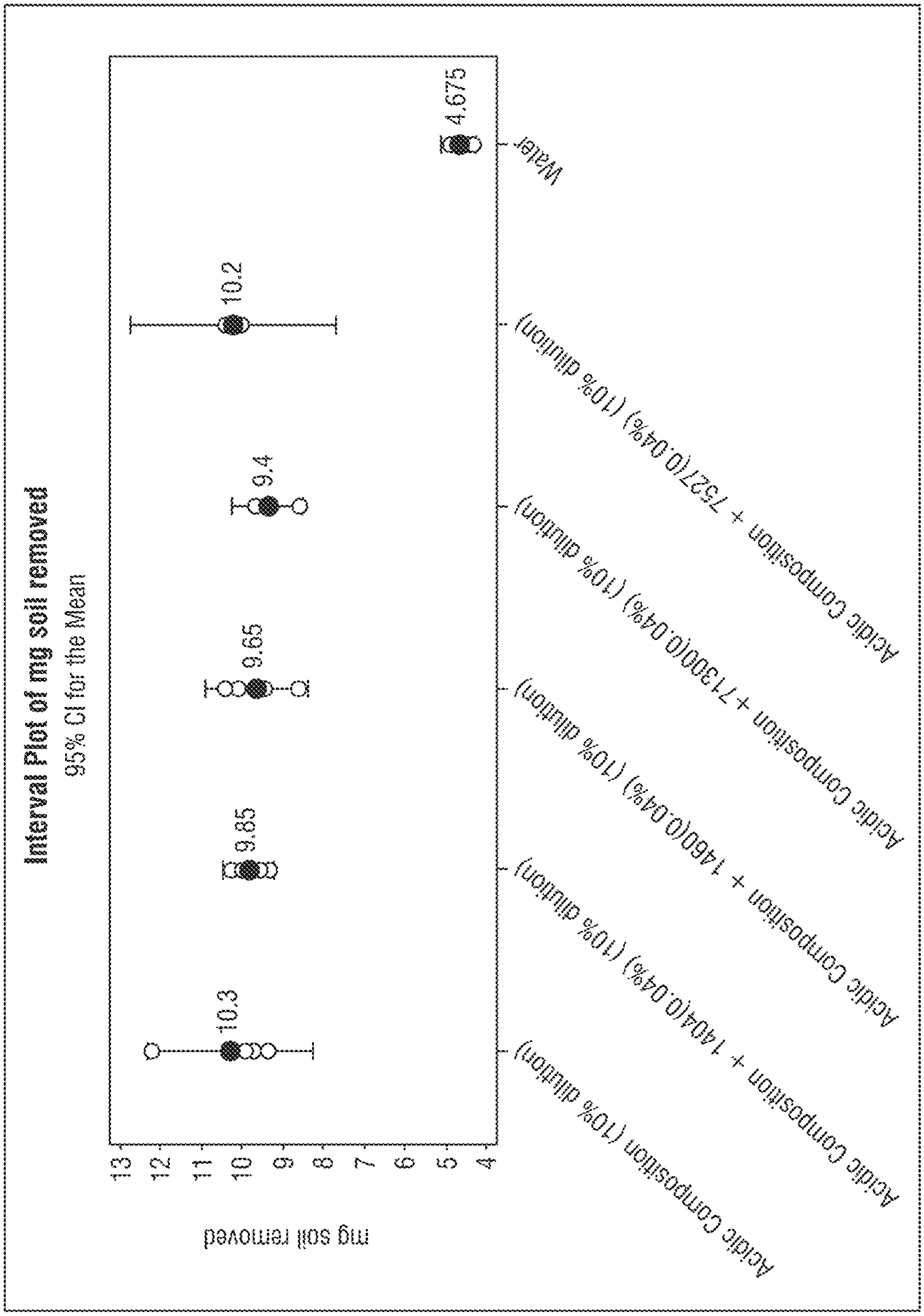
FIG. 8 shows the results of soap scum removal test results for the acidic compositions according to embodiments of the invention containing the inverse emulsion polymers compared to Controls without the polymers.

Evalulated Compositions: Cationic inverse emulsion polymers were added to a commercially available acidic bathroom cleaner formulation at a level of 0.04% in the concentrate and then diluted to 10% for the testing. The control cleaning composition is without any thickening polymer and/or xanthan (as the amount required for such a concentrate product is prohibitive) Test results are shown in FIG. 8 for the evalulated formulations. The data shows that the inverse emulsion polymers do not interfere with the soil removal and the chemistry is still able to move to the surface and act effectively.

The inventions being thus described, it will be obvious that the same may be varied in many ways. Such variations are not to be regarded as a departure from the spirit and scope of the inventions and all such modifications are intended to be included within the scope of the following claims. The above specification provides a description of the manufacture and use of the disclosed compositions and methods. Since many embodiments can be made without departing from the spirit and scope of the invention, the invention resides in the claims.

What is claimed is:

1. A sprayable acidic cleaning composition with reduced misting comprising:

(a) an effective cleaning amount of an acid source;

(b) from about 0.0001 wt-% to about 1 wt-% of a high molecular weight inverse emulsion polymer;

(c) at least one surfactant; and (d) water;

wherein the acidic composition reduces the formation of airborne aerosol particles having a micron size of less than about 10 when sprayed, and a use solution of the composition has a shear viscosity from about 1 to about 1000 cPs, and wherein the high molecular weight inverse emulsion polymer does not increase the shear viscosity of the composition more than about 10%.

2. The composition of claim 1, wherein the acid source comprises a strong mineral acid, an organic acid or a mixture thereof, and optionally further comprising an oxidizing source.

3. The composition of claim 2, wherein the acid source is selected from the group consisting of phosphoric acid and/or a carboxylic acid selected from the group consisting of citric acid, maleic acid, fumaric acid, benzoic acid, sorbic acid, sulfamic acid and mixtures thereof.

4. The composition of claim 1, wherein the composition has a pH from about 1 to about 7.

5. The composition of claim 1, wherein the inverse emulsion polymer is a cationic, nonionic, and/or zwitterionic polymer, and wherein the inverse emulsion polymer has a molecular weight of 1 million Da to 25 million Da and a particle size ranging from 0.1 to 10 microns.

6. The composition of claim 1, wherein the inverse emulsion polymer has a viscosity from 50 to 5000 cPs.

7. The composition of claim 1, wherein the inverse emulsion polymer is a cationic polymer selected from the group consisting of 2-(acryloyloxy)-N,N,N-trimethylethananminium (DMAEA.MCQ), diallyldimethylammonium chloride, dimethylaminoethyl acrylate methyl chloride quaternary salt, acrylamidopropyltrimethylammonium chloride, dimethylaminoethyl methacrylate methyl chloride quaternary salt, methacrylamidopropyltrimethylammonium chloride, or combinations of the same.

8. The composition of claim 1, wherein the inverse emulsion polymer does not increase the shear viscosity of the composition more than about 5%, and the compositions retains stability for at least about 1 year at room temperature.

9. The composition of claim 1, wherein the use solution of the composition has a shear viscosity from about 1 to about 200 cPs.

10. The composition of claim 1, wherein the surfactant is nonionic and/or amphoteric.

11. The composition of claim 10, wherein the surfactant is a linear alcohol ethoxylate, an amine oxide and/or cocoamido propyl betaine.

12. The composition of claim 1, wherein the composition comprises about 1 to about 20 wt-% of the acid source, about 0.0005 to about 0.5 wt-% of the inverse emulsion polymer, about 0.1 to about 25 wt-% of the surfactant(s), and about 25 to about 99 wt-% water, and optionally further comprising a compatible solvent, additional acidulant and/or an additional functional ingredient.

13. The composition of claim 12, wherein the solvent is a hydroxy substituted organic solvent selected from the group consisting of methanol, ethanol, propanol, isopropanol, ethylene glycol, diethylene glycol, propylene glycol, dipropylene glycol, propylene glycol methyl ether, propylene glycol ethyl ether, propylene glycol propyl ether, dipropylene glycol methyl ether, ethylene glycol methyl ether, ethyl glycol butyl ether, diethylene glycol butyl ether, and mixtures thereof.

14. The composition of claim 1, wherein the inverse emulsion polymer is formed through polymerization of monomers comprising cationic, nonionic and/or zwitterionic monomers, wherein (a) the nonionic monomer is acrylamide, methacrylamide, N,N-dimethylacrylamide, N,N-diethylacrylamide, N-isopropylacrylamide, N-vinylformamide, N-vinylmethylacetamide, N-vinyl pyrrolidone, hydroxyethyl methacrylate, hydroxyethyl acrylate, hydroxypropyl acrylate, hydroxypropyl methacrylate, N-tert-butylacrylamide, N-methylolacrylamide, or combinations thereof, (b) the cationic monomer is dialkylaminoalkyl acrylates and methacrylates and their quaternary or acid salts, or combinations thereof, and/or (c) wherein the zwitterionic monomer is N,N-dimethyl-N-acryloyloxyethyl-N-(3-sulfopropyl)-ammonium betaine, N,N-dimethyl-N-acrylamidopropyl-N-(2-carboxymethyl)-ammonium betaine, N,N-dimethyl-N-acrylamidopropyl-N-(3-sulfopropyl)-ammonium betaine, N,N-dimethyl-N-acrylamidopropyl-N-(2-carboxymethyl)-ammonium betaine, 2-(methylthio)ethyl methacryloyl-S-(sulfopropyl)-sulfonium betaine, 2-[(2-acryloylethyl) dimethylammonio]ethyl 2-methyl phosphate, 2-(acryloyloxyethyl)-2'-(trimethylammonium)ethyl phosphate, [(2-acryloylethyl)dimethylammonio]methyl phosphonic acid, 2-methacryloyloxy ethyl phosphorylcholine (MPC), 2-[(3-acrylamidopropyl)dimethylammonio]ethyl 2'-isopropyl phosphate (AAPI), 1-vinyl-3-(3-sulfopropyl) imidazolium hydroxide, (2-acryloxyethyl) carboxymethyl methylsulfonium chloride, 1-(3-sulfopropyl)-2-vinylpyridinium betaine, N-(4-sulfobutyl)-N-methyl-N, N-diallylamine ammonium betaine (MDABS), N,N-diallyl-N-methyl-N-(2-sulfoethyl)ammonium betaine, or combinations thereof.

15. The composition of claim 1, wherein the inverse emulsion polymer is formed through polymerization of monomers selected from the group consisting of dimethylaminoethyl acrylate methyl chloride quaternary salt, dimethylaminoethyl acrylate methyl sulfate quaternary salt, dimethylaminoethyl acrylate benzyl chloride quaternary salt, dimethylaminoethyl acrylate sulfuric acid salt, dimethylaminoethyl acrylate hydrochloric acid salt, dimethylaminoethyl methacrylate methyl chloride quaternary salt, dimethylaminoethyl methacrylate methyl sulfate quaternary salt, dimethylaminoethyl methacrylate benzyl chloride quaternary salt, dimethylaminoethyl methacrylate sulfuric acid salt, dimethylaminoethyl methacrylate hydrochloric acid salt, dialkylaminoalkylacrylamides or methacrylamides and their quaternary or acid salts such as acrylamidopropyltrimethylammonium chloride, dimethylaminoethyl acrylate methyl chloride quaternary salt, dimethylaminoethyl acrylate benzyl chloride quaternary salt, dimethylaminoethyl methacrylate methyl chloride quaternary salt, dimethylaminoethyl methacrylate benzyl chloride quaternary salt, methacrylamidopropyl trimethylammonium chloride, dimethylaminopropyl acrylamide methyl sulfate quaternary salt, dimethylaminopropyl acrylamide sulfuric acid salt, dimethylaminopropyl acrylamide hydrochloric acid salt, methacrylamidopropyltrimethylammonium chloride, dimethylaminopropyl methacrylamide methyl sulfate quaternary salt, dimethylaminopropyl methacrylamide sulfuric acid salt, dimethylaminopropyl methacrylamide hydrochloric acid salt, diethylaminoethylacrylate, diethyl aminoethylmethacrylate, diallyldiethylammonium chloride, diallyldimethylammonium chloride, and combinations thereof.

16. The composition of claim 1, wherein the composition does not include any xanthan and/or any conventional thickeners.

17. A system for applying sprayable acidic cleaning composition producing reduced misting upon spraying, the system comprising:

(a) a sprayer comprising a spray head connected to a spray bottle; and (b) an aqueous, ready-to-use cleaning composition contained by the spray bottle and the spray head adapted to dispense the aqueous composition;

wherein the cleaning composition comprises an effective cleaning amount of an acid source; from about 0.0001 wt-% to about 1 wt-% of a high molecular weight inverse emulsion polymer; at least one surfactant; and water, wherein the cleaning composition produces a total concentration of misting of particles having a micron size of 10 or less within a breathing zone of a user of less than or equal to 60 particles/$cm^3$, and wherein the composition has a shear viscosity from about 1 to about 1000 cPs, and wherein the high molecular weight inverse emulsion polymer does not increase the shear viscosity of the composition more than about 10%.

18. The system of claim 17, wherein the cleaning composition is produced in-line or in situ by combining the acid source, high molecular weight inverse emulsion polymer, surfactant(s), and water, and wherein the dissolution requires less than 10 minutes to form a homogenous solution.

19. The system of claim 17, wherein the sprayer is a low velocity sprayer.

20. A method of cleaning a hard surface using a sprayed, reduced misting, aqueous cleaning composition comprising:

(a) contacting a soiled surface with an aqueous cleaning composition comprising an effective cleaning amount of an acid source; from about 0.0001 wt-% to about 1 wt-% of a high molecular weight inverse emulsion polymer; at least one surfactant; and water, wherein the cleaning composition produces a total concentration of misting of particles having a micron size of 10 or less within a breathing zone of a user of less than or equal to 60 particles/$cm^3$, and wherein the composition has a shear viscosity from about 1 to about 1000 cPs, and wherein the high molecular weight inverse emulsion polymer does not increase the shear viscosity of the composition more than about 10%; and (b) wiping the hard surface to remove the treating film and any soil.

21. The method of claim 20, wherein the aqueous cleaning composition produces a total concentration of misting of particles having a micron size of 10 or less within a breathing zone of a user as measured in total number of particles per $cm^3$ of 60 particles/$cm^3$ or fewer.

22. The method of claim 20, wherein the applying step uses a trigger sprayer.

23. The method of claim 20, wherein said soil is a soap scum, or hard water scale.

* * * * *

UNITED STATES PATENT AND TRADEMARK OFFICE
CERTIFICATE OF CORRECTION

PATENT NO. : 10,370,626 B2
APPLICATION NO. : 15/603039
DATED : August 6, 2019
INVENTOR(S) : Victor Fuk-Pong Man et al.

It is certified that error appears in the above-identified patent and that said Letters Patent is hereby corrected as shown below:

In the Claims

In Column 36, Claim 7, Lines 52-53:
DELETE "trimethylethananminium"
INSERT --trimethylethanaminium--

In Column 37, Claim 14, Line 43:
DELETE "2-methacryloyloxy ethyl"
INSERT --2-methacryloyloxyethyl--

In Column 38, Claim 15, Lines 14-15:
DELETE "diethyl aminoethylmethacrylate,"
INSERT --diethylaminoethylmethacrylate,--

Signed and Sealed this
Twenty-second Day of October, 2019

Andrei Iancu
*Director of the United States Patent and Trademark Office*